United States Patent Office 3,453,726
Patented July 8, 1969

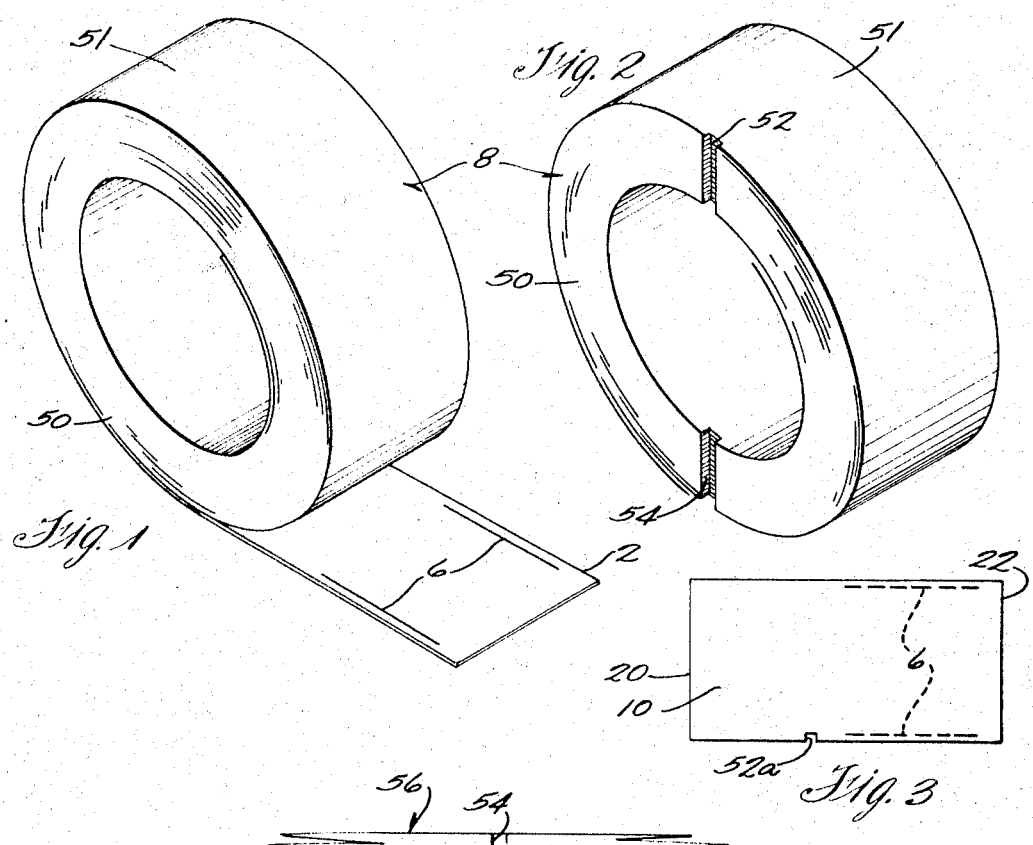
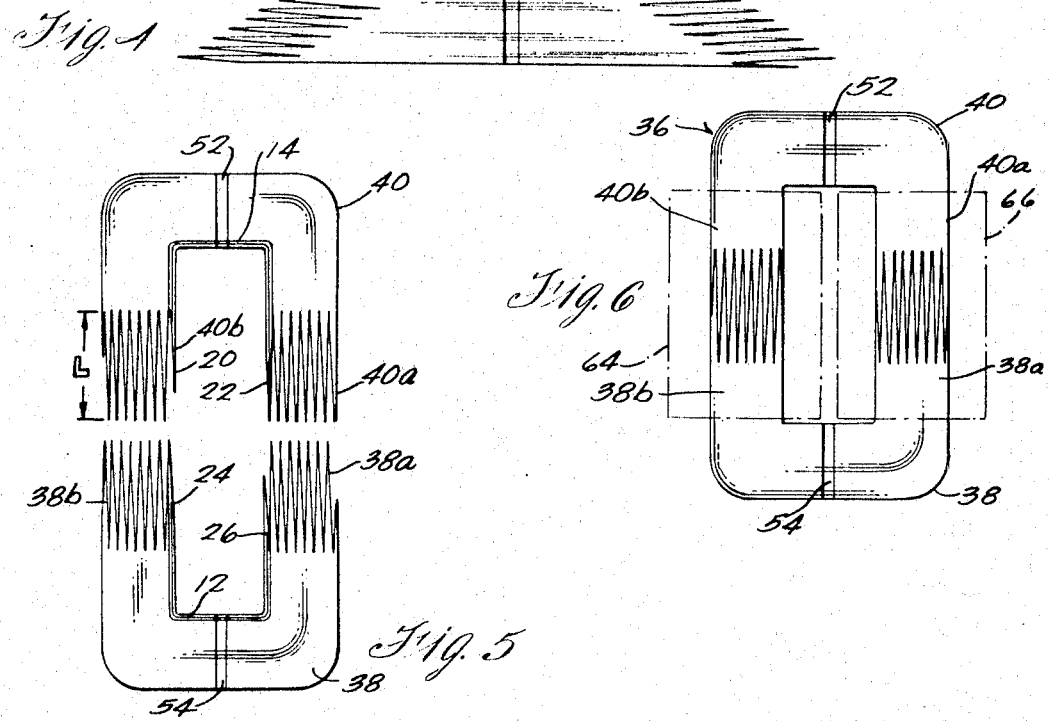

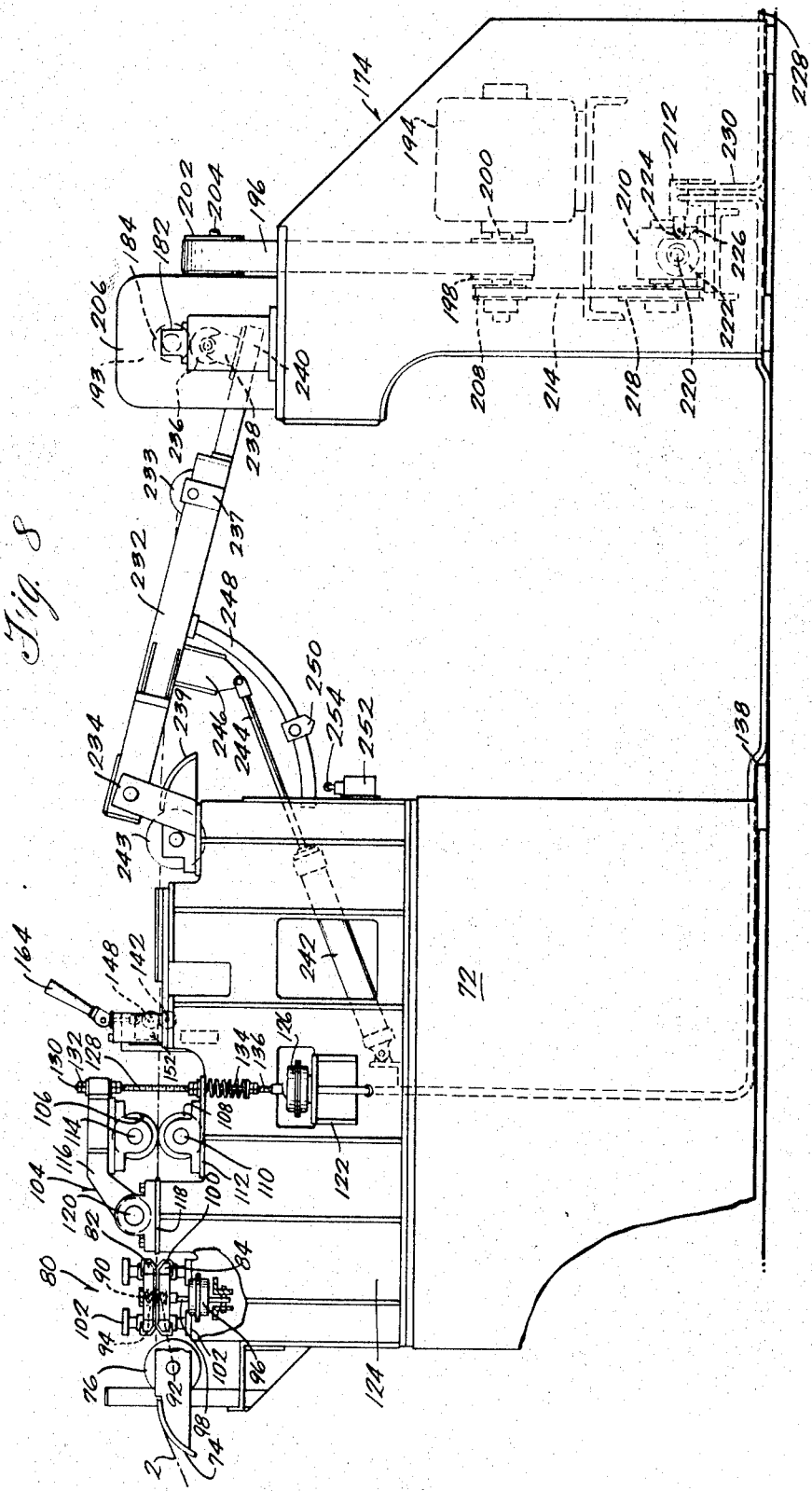

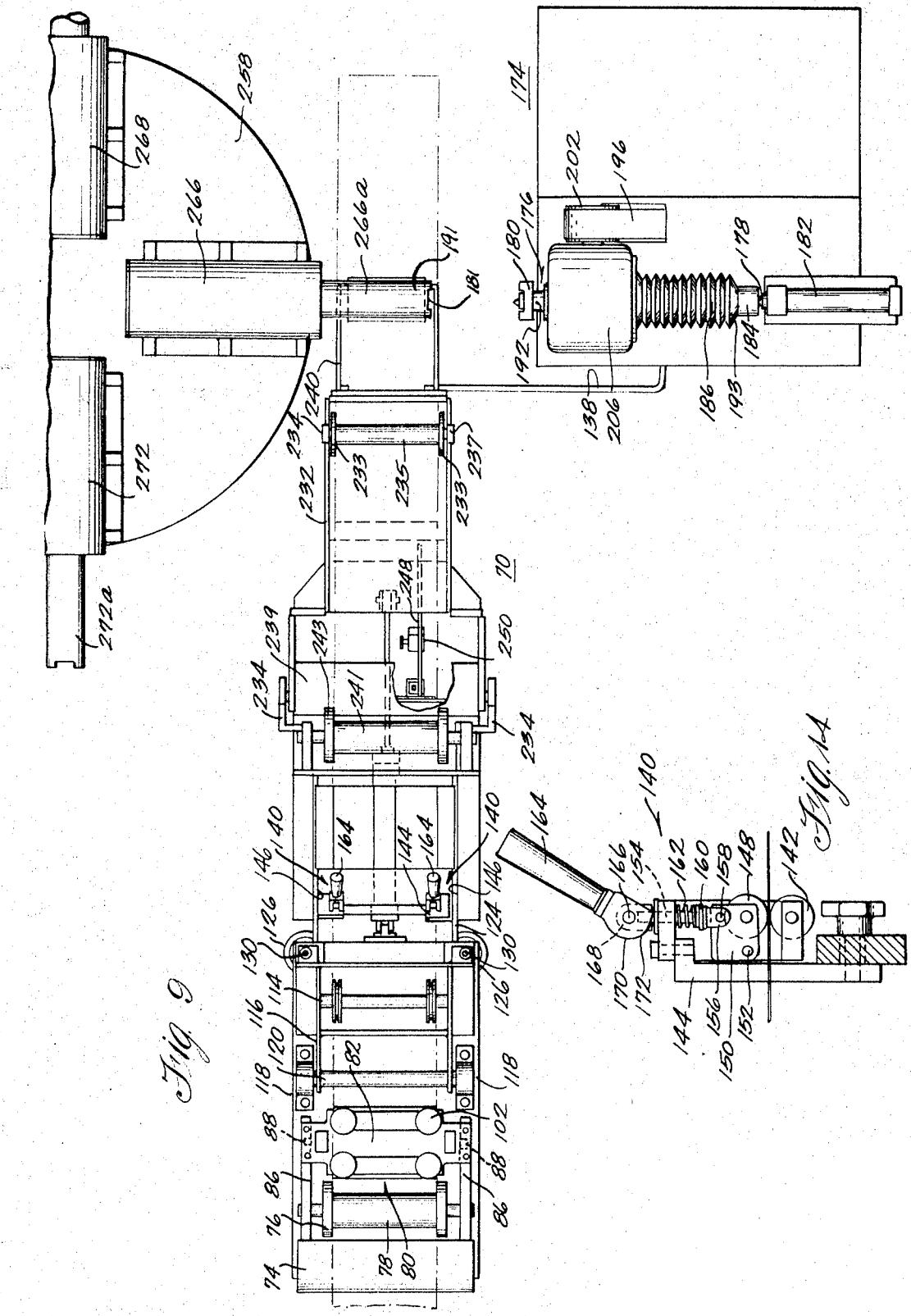

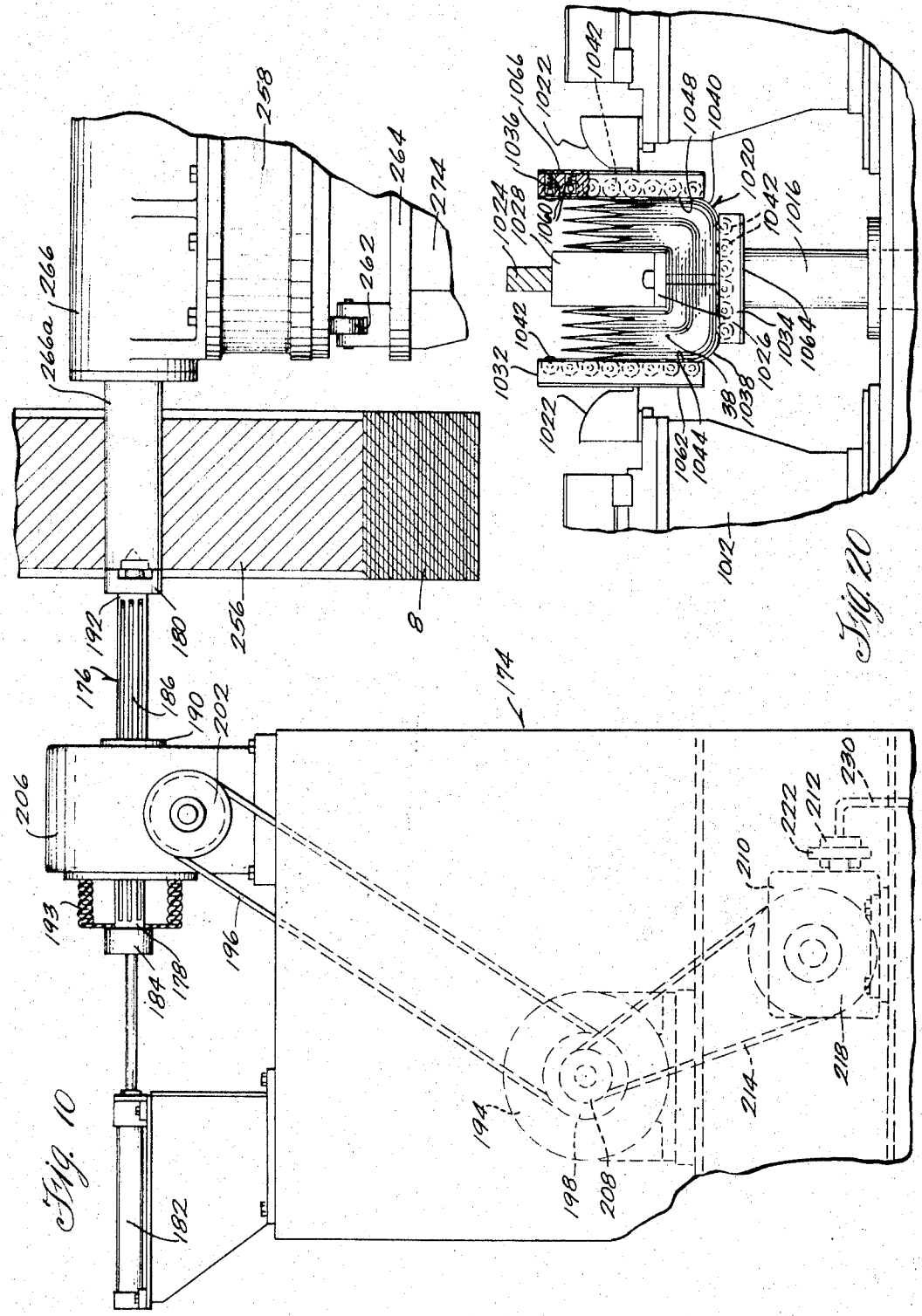

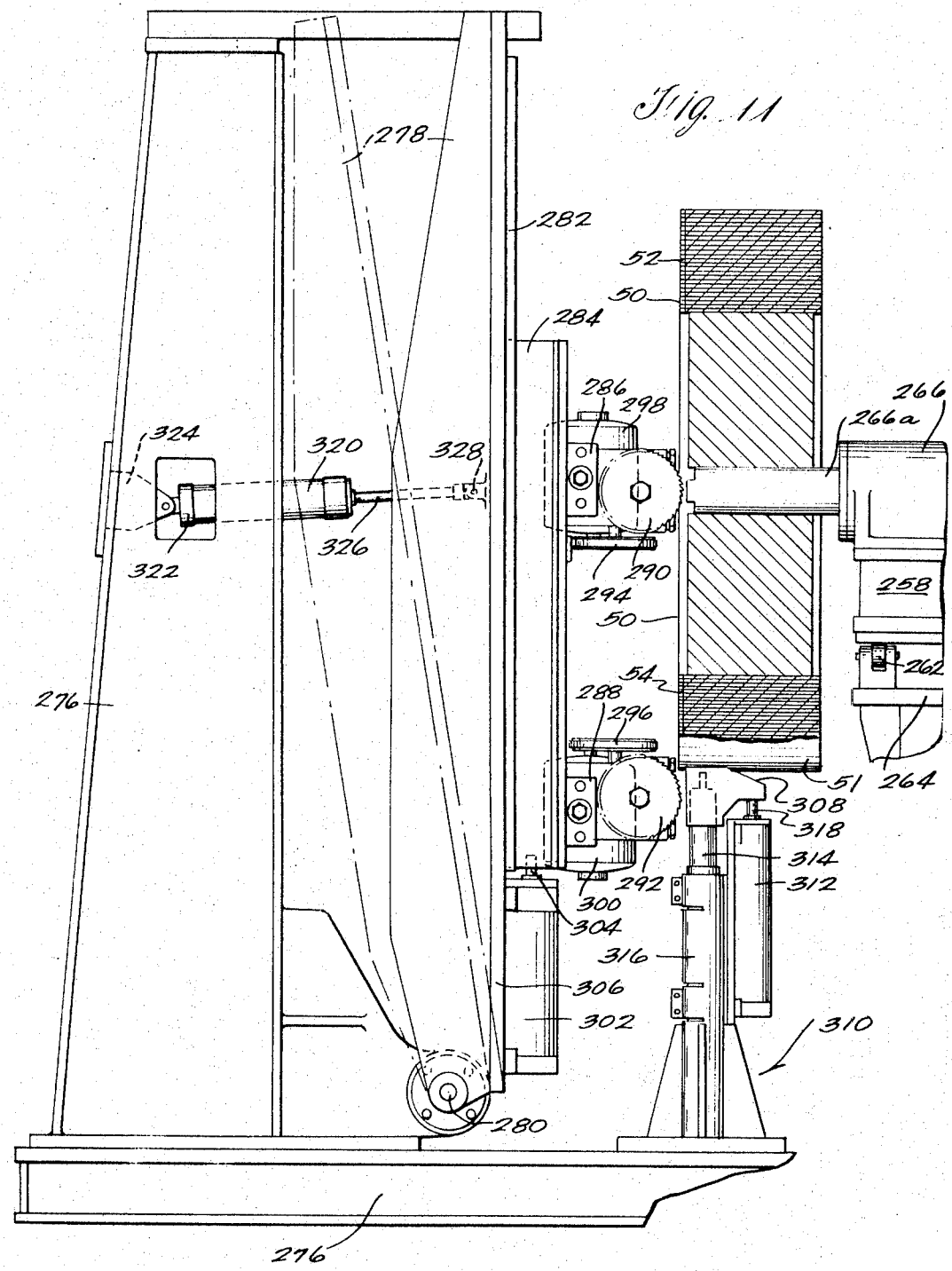

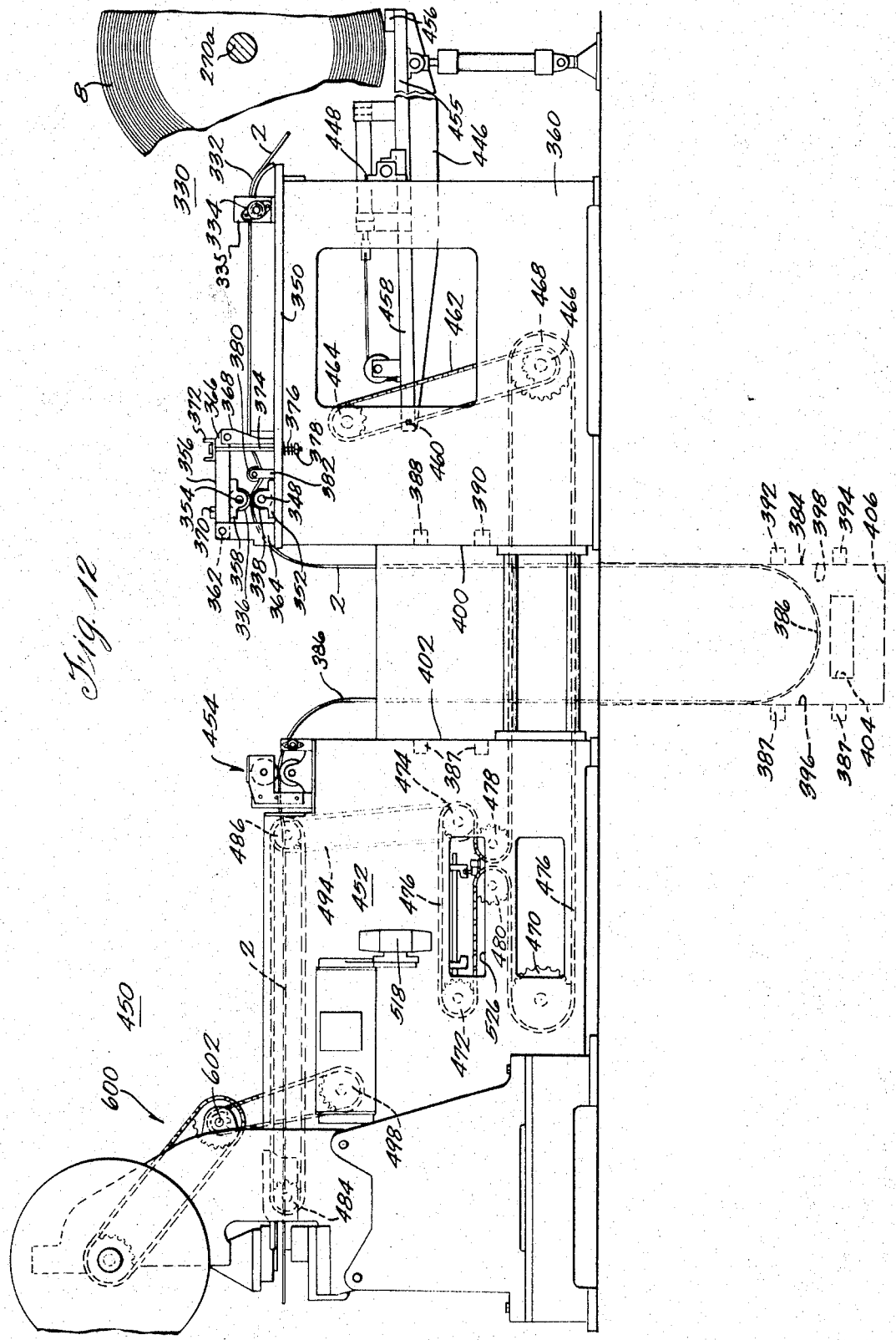

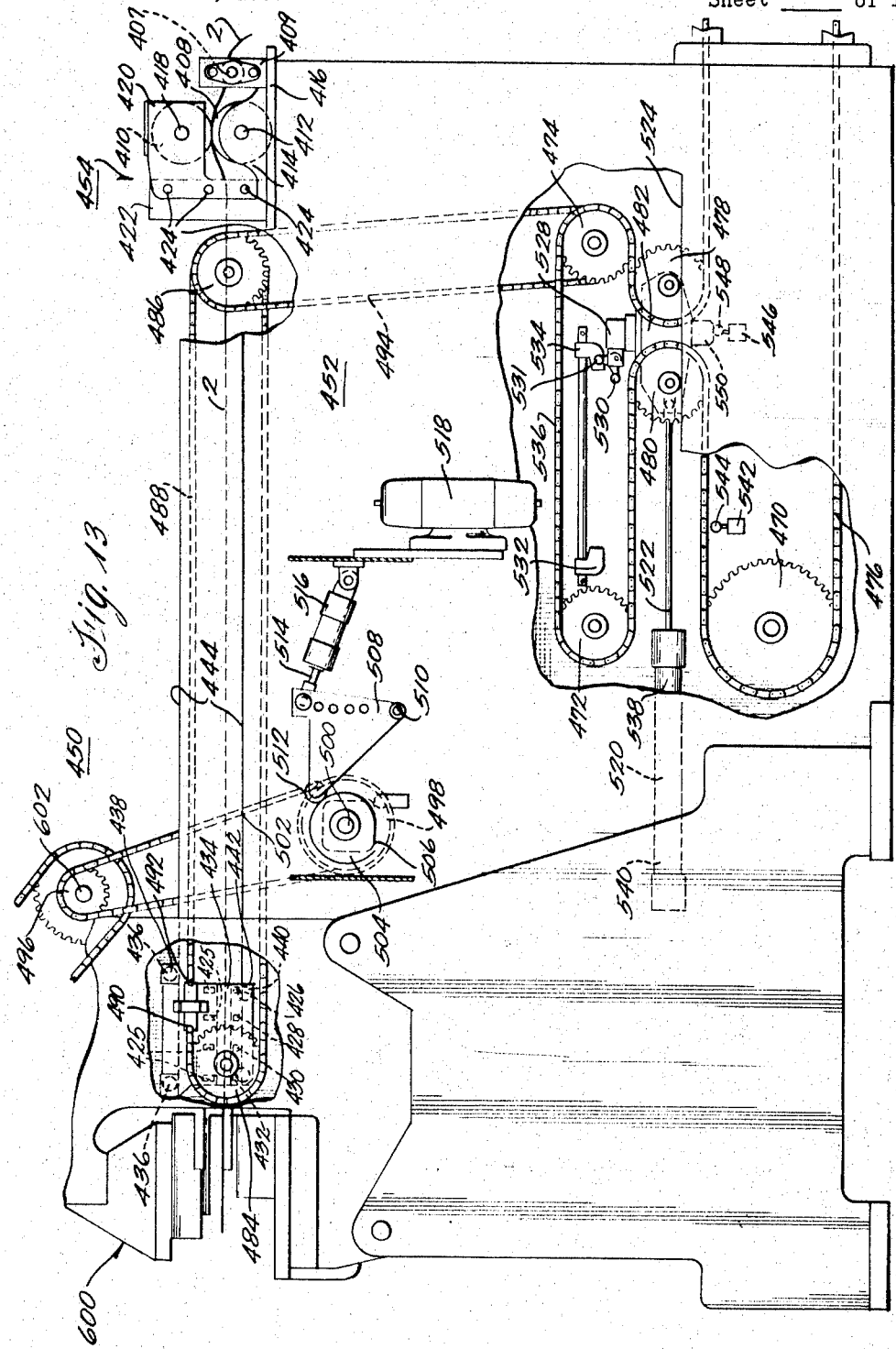

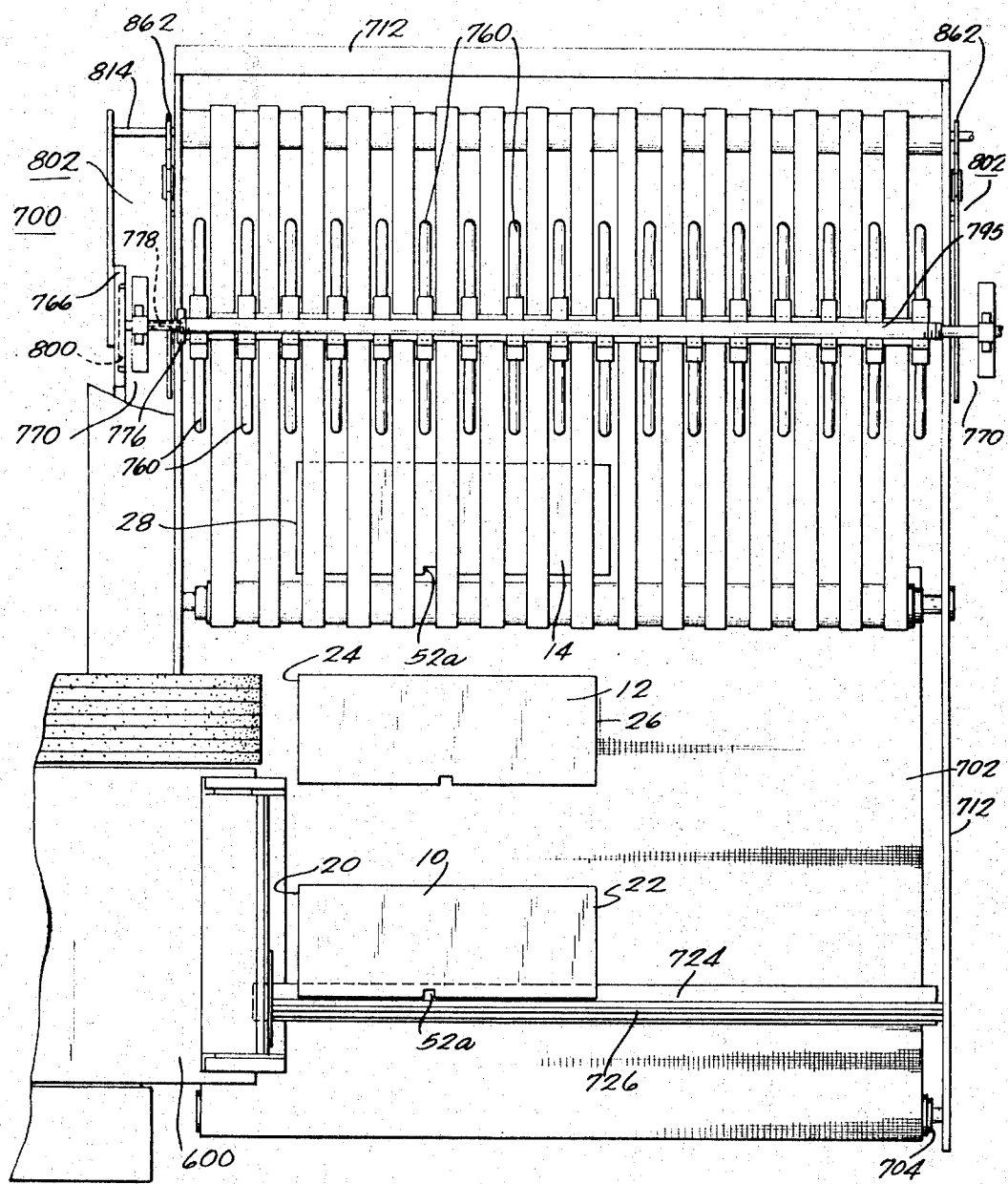

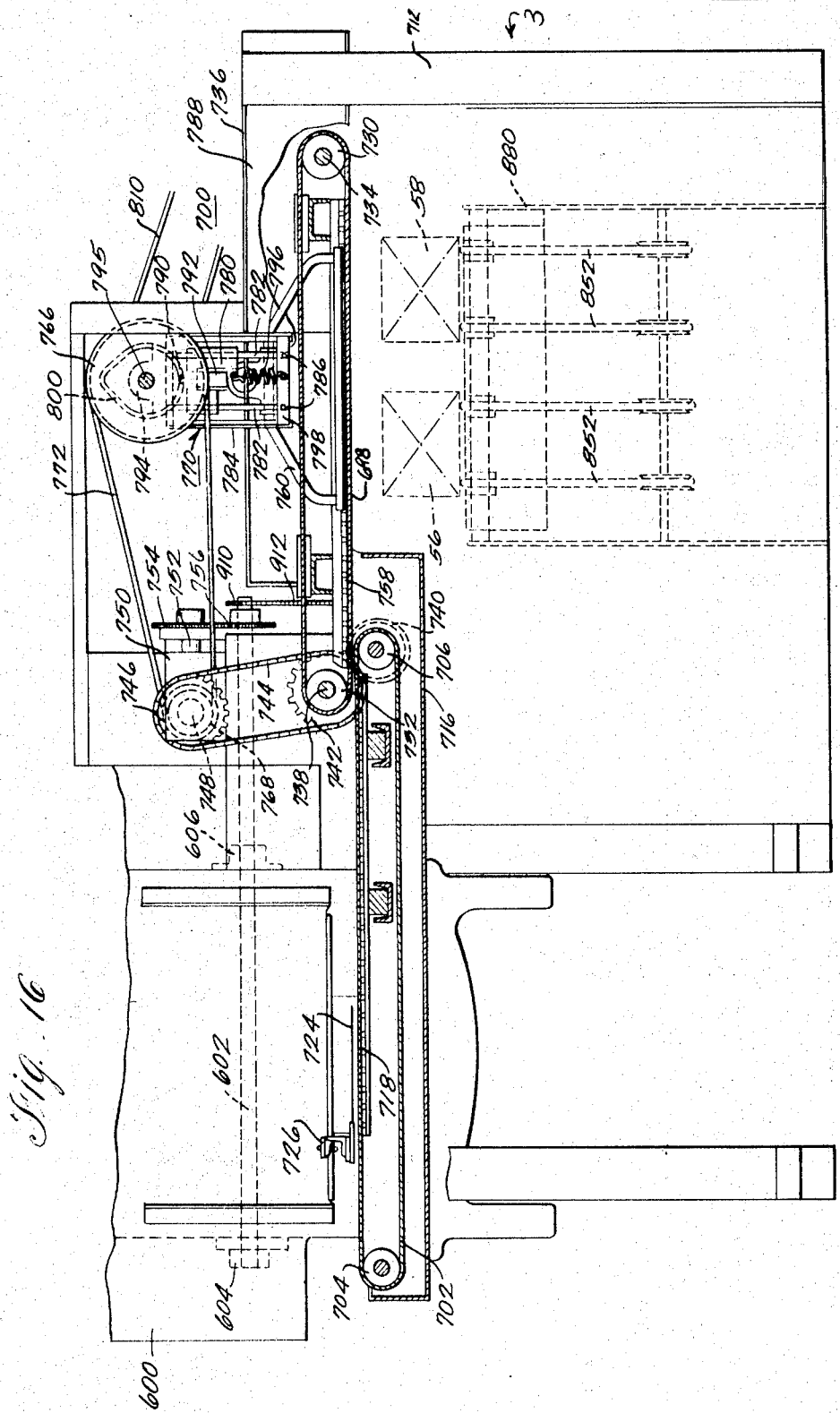

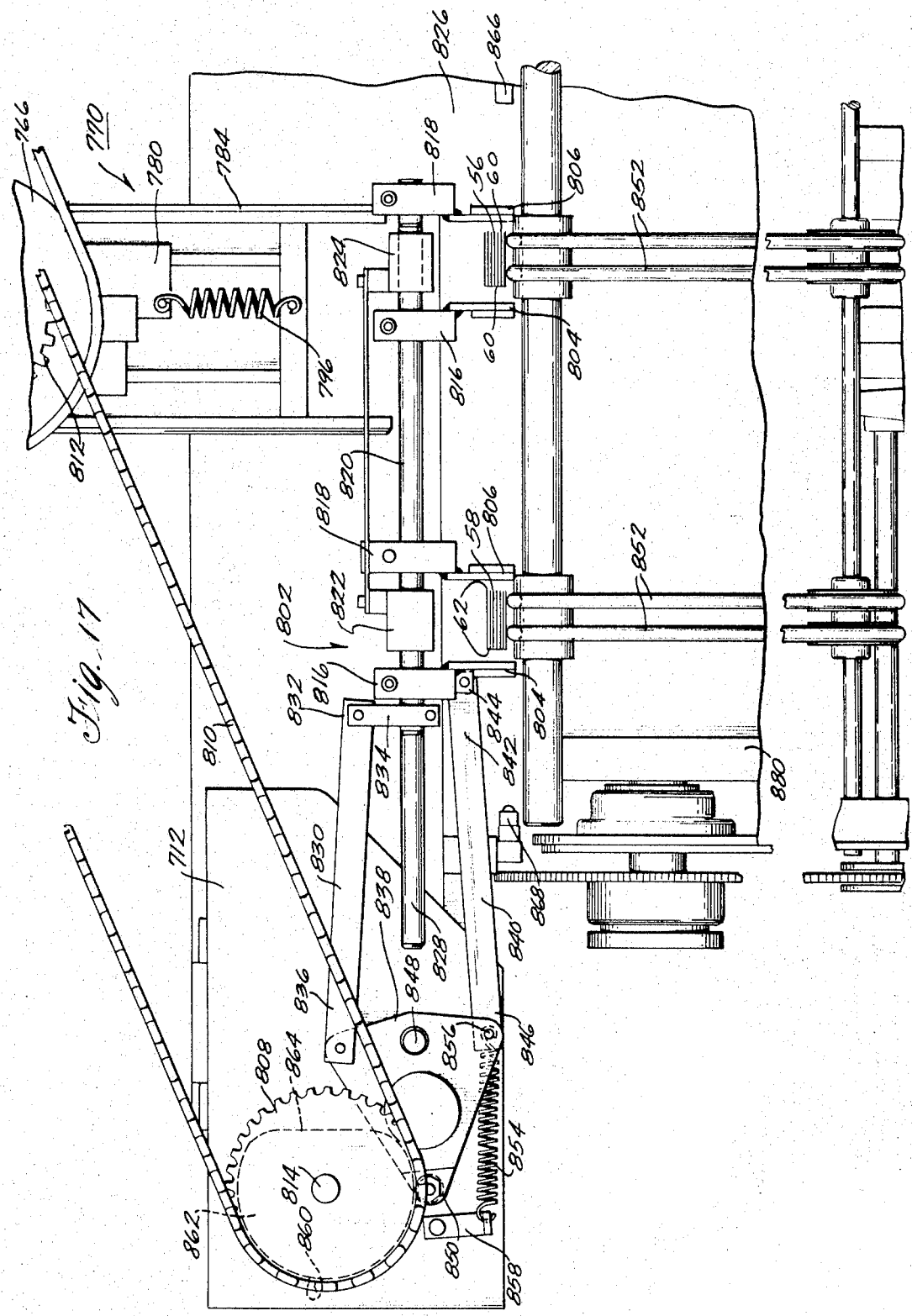

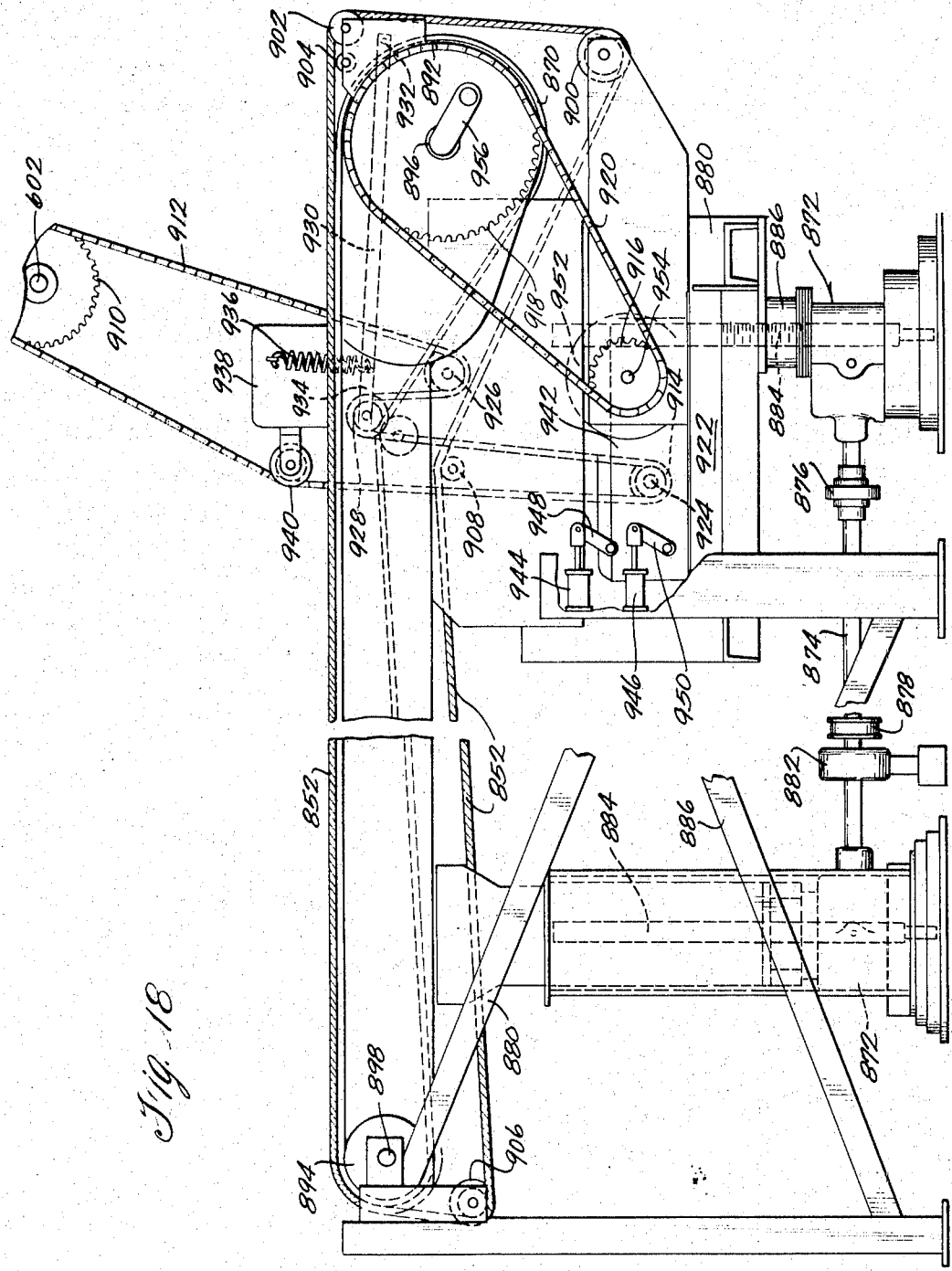

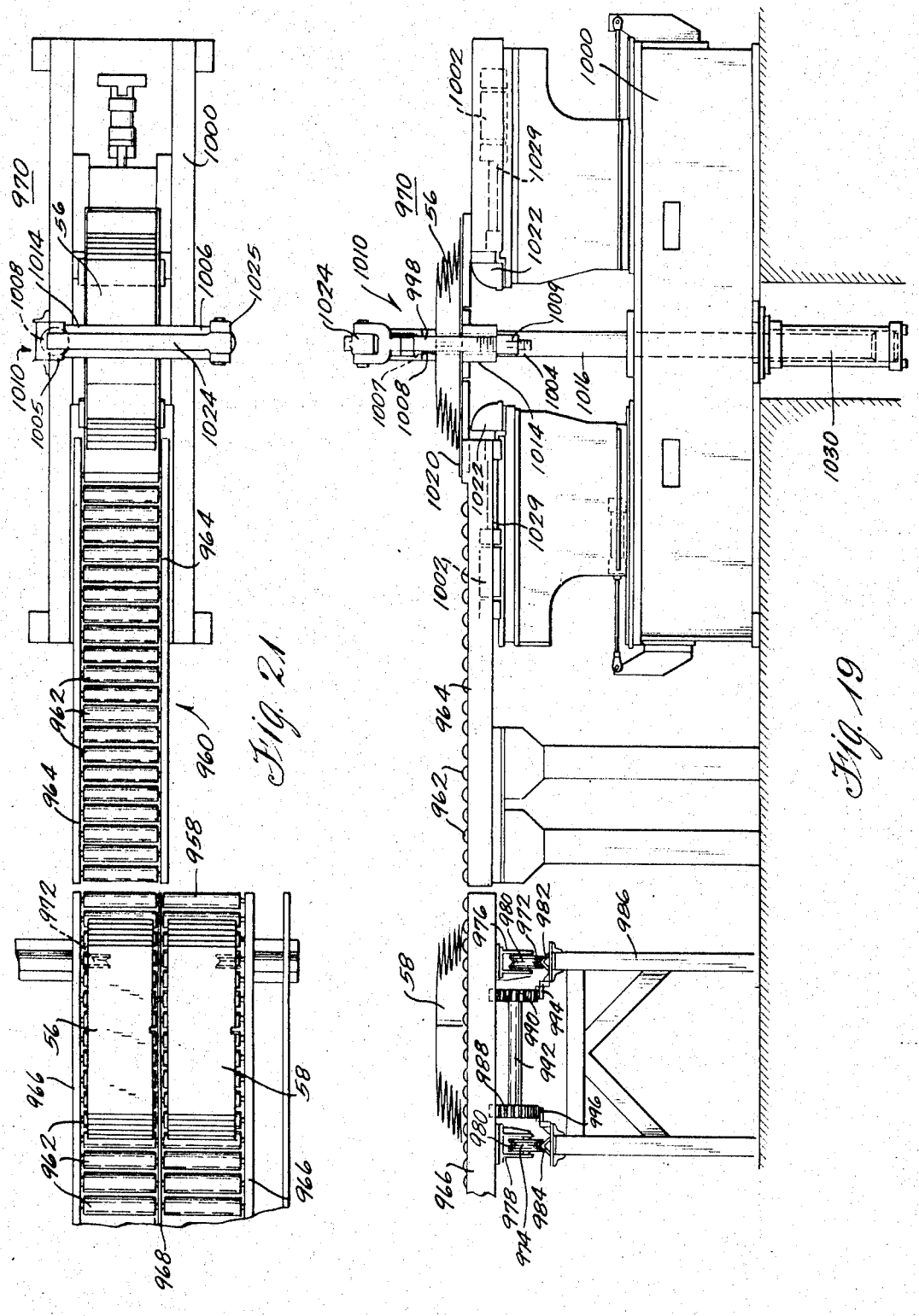

3,453,726
METHOD AND APPARATUS FOR MANUFACTURING A LAMINATED MAGNETIC CORE
Ralph M. Roen, Milwaukee, Wis., assignor to McGraw-Edison Company, Milwaukee, Wis., a corporation of Delaware
Filed Feb. 28, 1967, Ser. No. 619,229
Int. Cl. H01f 7/06; B65h 81/06
U.S. Cl. 29—605                                   15 Claims

ABSTRACT OF THE DISCLOSURE

A machine for manufacturing laminated, staggered lap joint transformer cores from strip steel. The machine has apparatus for: (1) forming space factor grooves in the steel and winding a measured length in a toroidal core; (2) cutting reference slots along a diameter of the core; (3) unwinding the core and removing the grooves; (4) cutting the steel into laminations of a length varying in accord with a movable reference slot sensing mechanism positioned by a chain connection to an automatic stepping device and a core diameter sensing arm; (5) stacking the laminations with the reference slots aligned; (6) bending the stacks into core sections.

---

This invention relates to magnetic inductors of the laminated core type, and particularly to a method and apparatus for manufacturing these magnetic inductors.

Laminated magnetic cores are generally made from grain-oriented, high silicon strip steel material. One type of laminated magnetic inductor is made by winding the strip material in a continuous length on a mandrel and then removing the wound core from the mandrel and winding an electrical coil onto the wound core. This method of manufacture is advantageous in that fabrication of the magnetic core is easy. However, winding of the electrical coil directly onto the wound core is quite difficult. Winding of the electrical coil directly on the wound core entails attaching winding apparatus onto the core. The winding apparatus takes up considerable room on an arm of the core thus usually requiring more core material or length for the winding of the electrical coil than is actually required for the operational size of the magnetic core.

Winding of the electrical coil directly onto the magnetic core may be avoided either by cutting the strip material into lamination sheets and forming the sheets into a magnetic core or by cutting through the wound core and bending open the core arms. The electrical winding may then be placed over the open ends of the lamination sheets making up the magnetic core arms. The problems that arise by this method of manufacture include the fitting of the lamination ends tightly together after the electrical coil is placed on the core. If a tight fit of lamination ends is not obtained, air gaps will result between the lamination ends which increase the reluctance of the wound core and decrease the efficiency of the core. The gaps between the lamination ends are due either to inaccuracies in cutting the individual sheets or to stress occurring in the wound core while it is being wound. The solution to the air gap problem is to add a space factor to the lamination sheets as they are being cut or to the wound core as it is being wound. Addition of space factor results in a slight extra length of the laminations allowing an abutting fit after the electrical coil is placed on the magnetic core. Another approach to eliminating the increased reluctance due to air gaps between lamination ends that is often used in conjunction with addition of space factor is the overlapping of the lamination ends. The overlapping of lamination ends allows for flux transfer from one lamination to the adjacent lamination at the overlapping point rather than through an air gap having greater reluctance.

Another problem involved in cutting individual lamination sheets or cutting the wound magnetic core and then bending the lamination sheets or wound core into its final configuration after the electrical coil is placed on it is the loss of magnetic circuit efficiency due to stress placed in the silicon steel by the bending operation.

Various solutions have been offered to solve the problems briefly discussed above. These solutions have generally required a considerable amount of manual labor and a high cost of manufacture to obtain a high quality, efficient magnetic core. Many of the approaches proposed have not actually solved the problems or have been too impractical to use.

Accordingly, a principal objective of the present invention is to provide an economical method and apparatus for the manufacture of high quality, efficient, laminated magnetic core inductors.

Another objective of the invention is to provide a method and apparatus for the rapid manufacture of laminated magnetic core inductors requiring a minimum amount of manual labor.

Another objective of the invention is to provide an improved method and apparatus for manufacturing laminated magnetic core inductors.

Another objective of the invention is to provide a method and apparatus for accurately adding a controlled space factor to a laminated magnetic core inductor.

A further objective of the invention is to provide a method and apparatus for the accurate and easy measurement of the length of strip steel material required for a given size of laminated magnetic core inductor.

A further objective of the invention is to provide a method and apparatus for automatically, rapidly and accurately determining the size of the lamination sheets for the laminated magnetic core inductors.

A still further objective of the invention is to provide a method and apparatus for automatically and accurately stacking the lamination sheets in a configuration which will provide an abutting and overlapping fit of lamination sheets in the laminated magnetic core inductors.

A still further objective is to provide a method and apparatus for forming the stacks of lamination sheets into laminated magnetic core inductor sections.

Other embodiments, modifications, and objectives of the invention will be apparent from the following description when taken in conjunction with the accompanying drawings, wherein:

FIG. 1 is a perspective view of a measured length of wound strip steel material;

FIG. 2 is a similar perspective of a wound core having a pair of openings formed along one of its flat sides;

FIG. 3 is a top view of a lamination sheet cut from a wound core;

FIG. 5 is a side view of two stacks of lamination sheets formed into magnetic core inductor sections;

FIG. 6 is a side view of magnetic core inductor sections fitted together with electrical coils shown in phantom;

FIG. 7 is a plan view of the apparatus of the invention;

FIG. 8 is a side view of a winding station having portions broken away;

FIG. 9 is a top view of the winding station and a spindle table;

FIG. 10 is a side view of a drive unit for the winding station;

FIG. 11 is a side view of a slot cutting station showing a wound core in broken section;

FIG. 12 is a side view in the direction of arrow 5 in FIG. 7, of an unwinding and cutting station;

FIG. 13 is a side view, partly in broken section, in the direction of arrow 5 in FIG. 7, showing the cutting station;

FIG. 14 is an enlarged side view, partly in broken section, of the deburrer unit shown in FIG. 8;

FIG. 15 is a top view of the cutting station, a stacking station and a connecting conveyor mechanism;

FIG. 16 is a side view, partly in broken section, of the conveyor mechanism and stacking station;

FIG. 17 is a side view, from a direction opposite to that of FIG. 16, of a lamination stack aligning mechanism at the stacking station;

FIG. 18 is a side view, partly in broken section, in the direction of arrow 3 in FIG. 16, of a stacking conveyor at the stacking station;

FIG. 19 is a side view of a forming station and a transfer conveyor between the stacking conveyor at the stacking station and the forming station;

FIG. 20 is a broken away side view of a laminated magnetic core section in formed position at the forming station;

FIG. 21 is a top view of FIG. 19.

*Method of manufacturing a laminated core*

Figure 4:
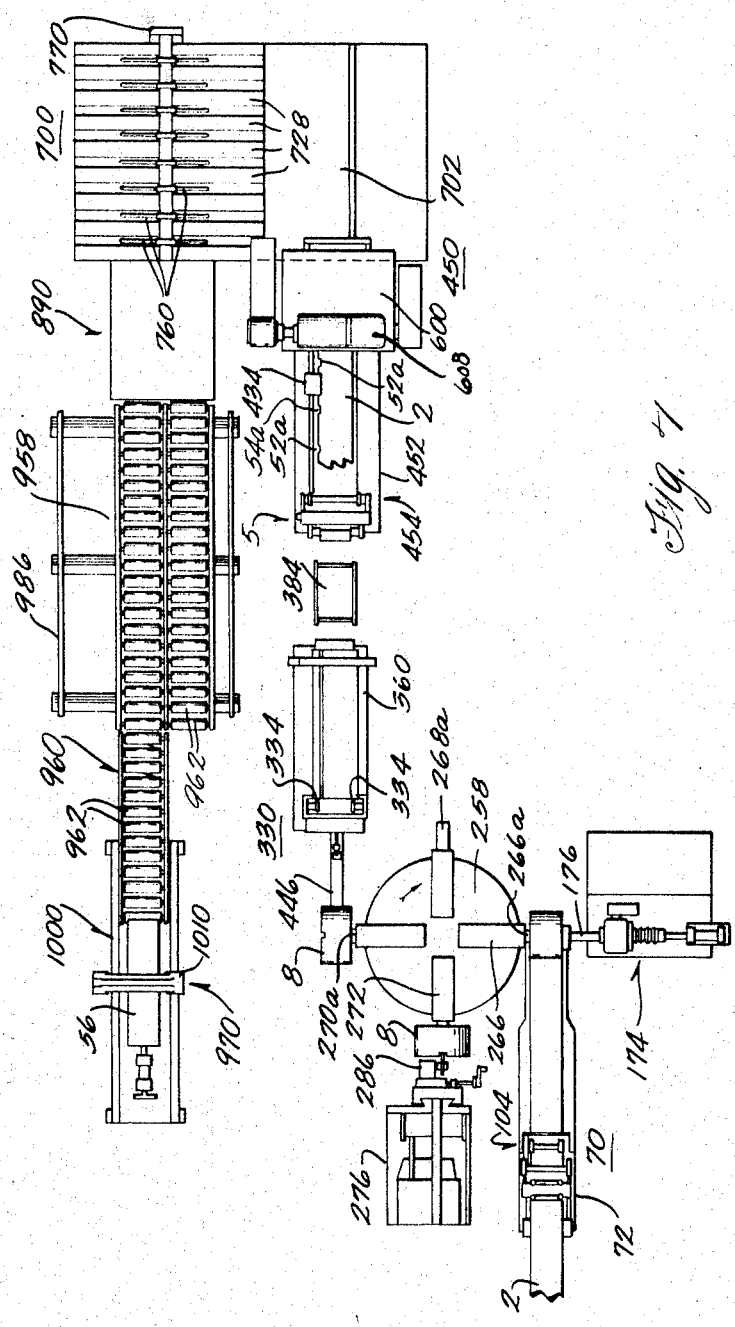
FIG. 4 is a side view of a stack of lamination sheets.

FIGS. 1–6 show transformer core material at various steps in the manufacture of a laminated transformer core by the method of the invention.

As shown in FIG. 1, pairs of parallel coextensive grooves 6 are formed at predetermined intervals in the strip material 2 adjacent its edges. A pair of the grooves 6 are shown at FIG. 3 in a laminated sheet 10 which has been cut from the strip material 2 and which will be discussed in more detail below. Subsequent to the forming of the grooves 6, the strip material 2 is rewound into a wound core 8 shown in FIGS. 1 and 2. The presence of the grooves 6 results in a certain degree of looseness in the wound core 8 such that, for the same length of strip material 2, the circumference of the wound core 8 will be somewhat greater than that of a stock roll (not shown) of strip material 2. The purpose of the looseness in the wound core 8 is to insure a close fit of abutting lamination ends such as abutting lamination ends 20 and 24 after the strip material 2 of wound core 8 is cut into lamination sheets such as lamination sheets 10 and 12, stacked (see FIG. 4), and formed into core sections 38 and 40 (see FIG. 5), all discussed below. Without the looseness in the wound core 8, the strip material 2 would be under whatever tension was applied to the strip material 2 while it was being wound into wound core 8. Upon forming the transformer core 36, shown in FIG. 6, the laminations could not be satisfactorily put under tension and consequently their ends 20 and 24 and 22 and 26 would not meet. By addition of the looseness, sometimes referred to as space factor, the tension is eliminated and a tight abutting fit of lamination ends such as ends 20 and 24 and 22 and 26 can be obtained.

The amount of the looseness can be controlled by the depth of the grooves 6 and the longitudinal spacing between the grooves 6. Good results have been obtained for most cores by forming the grooves in the strip material 2 at a depth of approximately .03" at every 5⅓ turns of the wound core 8. It should be added that the longitudinal distance between the grooves should be such that the grooves 6 of adjacent layers or laminations such as lamination sheets 10 and 14 do not register with each other. The reason for this is that the grooves 6 tend to break through an insulating coating (not shown) on the strip material 2 and if the grooves 6 register, magnetic circuit breakdown will occur to cause interlaminar eddy current losses.

The wound core 8 may be wound to have the radial thickness required for the transformer core 36 being made. The slots 52 and 54, as shown in FIG. 2 are formed along a diameter of the side wall 50 of the wound core 8 by any suitable method, e.g., a milling cutter. When the strip material 2 of the wound core 8 is unwound, the slots 52 and 54 will appear as an alternating series of slots 52a and 52b (see FIG. 7) which may be used as a reference to locate the cutting position for each of the lamination sheets.

As the wound core 8 is unwound the grooves 6 may be removed by any suitable compressive method. The strip material 2 of the wound core 8 may then be cut into the individual laminations such as lamination sheets 10 and 12. The former location of the grooves 6 are shown dotted on the lamination sheet 10 in FIG. 3. Using the slots 52a and 54a as a reference, laminations such as lamination sheets 10 and 12 are cut from the strip material 2 at points incrementally varying about the midpoint between each pair of slots 52a and 54a. Those laminations having slots 54a formed in them and those laminations having slot 52a formed in them are stacked, respectively, in two separate stacks 56 and 58 (see FIGS. 4 and 16). The result of this separate stacking is, after forming, two transformer core sections 38 and 40 having mating staggered ends 38a and 40a and 38b and 40b. The increment change in length between each adjacent lamination can be varied as required to obtain maximum flux transfer efficiency between adjacent laminations overlapped at the staggered joint. Good performance has been obtained from an increment of one-half inch which, of course, gives lamination overlap of one-half inch.

The laminated stacks 56 and 58 are individually formed into U-shaped core sections 38 and 40. After annealing (not shown), the coils 64 and 66, shown in phantom in FIG. 6, are placed on the core sections 38 and 40. The respective mating ends 38a and 40a, and 38b and 40b, of the core sections 38 and 40 are then fitted together to form a completed transformer core 36.

*Principal parts and general theory of operation of core manufacturing machine*

In FIG. 7 is shown a plan view of a machine for manufacturing laminated core sections or halves 38 and 40 having mating, staggered ends 38a, 38b, 40a and 40b, obtained by controlled increment changes in the length of each adjacent lamination such as lamination sheets 10 and 14.

A winding station 70 is shown in FIGS. 7, 8 and 9. At this station strip core material 2 is fed through the winding station 70 and wound on a free wheeling spindle shaft such as spindle shaft 266a. A tension brake 80 for maintaining tension on the strip material 2 as it passes through the winding station 70 and is wound on spindle shaft 266a is mounted on stationary table 72. A deburrer 140 is positioned on stationary table 72 for removing burr along the edges of the strip material 2. Also mounted on the stationary table 72 is a grooving unit 104 for forming a pair of grooves 6 at spaced intervals in strip material 2. The grooving unit 104 includes a pair of upper grooving wheels 106 and a pair of lower grooving wheels 108 reciprocally operated into contact with the strip material 2 by air diaphragms 126 (see FIGS. 9 and 14).

The spindle supports 266, 268, 270 and 272, having spindle shafts 266a, 268a, 270a and 272a, are mounted on rotatable spindle table 258, as shown in FIG. 7. Any one of the spindle supports 266, 268, 270 and 272 may be rotated on spindle table 258 into winding position to receive strip material 2 on its spindle shaft at the winding station 70. As shown in FIG. 9, the spindle support 266 and its spindle shaft 266a are in winding position at winding station 70 and for purposes of the present description, will alone be referred to as the spindle support and spindle shaft cooperating with other parts of the machine. When in the winding position, the spindle shaft 266a is driven by the reciprocally engageable drive shaft 176 of drive unit 174 to simultaneously pull the strip material 2 through the winding station 70 and wind the strip material 2 on the mold 256 mounted on the spindle shaft 266a (see FIG. 10). A diameter sensing arm 232 follows the outer circumference of the strip material 2 as it is wound on the mold 256. When the wound core 8 reaches a predetermined diameter, the diameter sensing arm 232 will contact limit switch 252 to stop the drive unit 174.

A slot milling or cutting station 260 is shown in FIG. 11. After the strip material 2 is wound onto mold 256 to form wound core 8, the spindle table 258 may be rotated to position spindle 266a and wound core 8 in cutting position at the slot cutting station 260, as shown in FIG. 11. To hold wound core 8 firmly in position during the slot cutting operation, a clamp 310 is raised into bracing engagement with the wound core 8 by hydraulic cylinder 312. The milling support 278, which is provided with cutting wheels 290 and 292 and is pivotally mounted on shaft 280 supported on milling frame 276, may now be moved toward the wound core 8 to cut the slots 52 and 54 along a diameter in the side 50 of the wound core 8.

On FIG. 12 the strip material 2 from wound core 8 is shown feeding through an unwinding station 330. After the slot cutting operation, the wound core 8 is rotated on spindle table 258 to the unwinding position where the strip material 2 may be unwound. The strip material 2 is unwound from wound core 8 at a substantially steady rate by an upper pull roll 336 and a lower pull roll 338 mounted on stationary table 360.

At the lamination cutting station 450, shown in FIGS. 12 and 13, the strip material 2 is shown being driven by a lower drive roll 408 and an upper drive roll 410. The drive rolls 408 and 410 are driven by a variable speed hydraulic motor (not shown). The photocells 426, 428, 430 and 432 sense the presence of the milled slots 52a and 54a in the moving strip material 2, and, by their connection through an electrical control circuit (not shown) to the hydraulic motor (not shown), cause the hydraulic motor and the drive rolls 408 and 410 to slow down and stop when a slot 52a or 54a is under photocell 432. It can thus be seen that a difference in the speed of the strip material 2 between the unwinding station 330 and the lamination cutting station 450 will occur each time the strip material 2 is brought to a stop at the lamination cutting station 450. To provide for the humping of strip material 2 that results from this speed difference, a receptacle 384 for an excess material loop 386 is provided between the unwinding station 330 and the lamination cutting station 450. The size of the excess material loop 386 will also be affected in the event of any malfunction in the continuity of operation of the lamination cutting station 450 or the unwinding station 330. The photocells 388, 390, 392 and 394 are mounted in the walls of receptacle 384 to sense the amount of excess material loop 386 present and are connected through an electrical control circuit (not shown) to a variable speed electric motor (not shown) driving pull rolls 336 and 338. If the lower end 385 of the excess material loop 386 moves upward or downward past the photocells 388, 390, 392 and 394, the photocells will act to change the speed of the variable speed electric motor (not shown) to maintain the lower end 385 of the excess material loop 386 at a position between photocells 390 and 392. In order to prevent the excess material loop 386 from leaving the receptacle 384 and looping outward above the receptacle 384, a low pressure condition is maintained in the bottom end 406 of the receptacle 384 immediately below the lower end 385 of the loop 386.

A cutting press 600, shown in FIGS. 12 and 13, is mounted on stationary table 452 at the laminating cutting station 450. The cutting press 600 is operated by electric motor 608 to cut strip material 2 each time a slot 52a or 54a appears under photocell 432. The photocells 426, 428, 430 and 432 are mounted on photocell carriage 434 which has its position varied on guide bar 444 along the length of strip material 2. As the position of the photocell carriage 434 and the photocells 426, 428, 430 and 432 move, the length of the laminations such as lamination sheets 12 and 14 cut by cutting press 600 varies to give a staggered appearance to the laminations when stacked as shown in FIG. 4.

The position of the photocell carriage 434 is varied by a core buildup control arrangement and an increment control arrangement. The core buildup control arrangement includes a diameter sensing arm 446 pivotally attached to stationary table 360 and attached at one end to a chain and sprocket arrangement connected through increment slide frame 482 to the photocell carriage 434. The end 455 of diameter sensing arm 446 follows the diameter of wound core 8 as it decreases during the unwinding of the wound core 8. The inner circumferences of the strip material 2 making up the wound core 8 will, when cut, become the inner, shorter laminations of the finished transformer core 36. It is thus desirable that as the circumference, and thus the diameter, of the wound core 8 becomes smaller, the laminations such as lamination sheets 12 and 14 become shorter. This requires that the photocell carriage 434 and photocells 426, 428, 430 and 432 move closer to the cutting press 600 and place the slots 52a and 54a closer to the cutting press 600 to result in cutting of shorter laminations such as lamination sheets 12 and 14. To obtain this result, the end 456 of diameter sensing arm 446 follows the decreasing diameter of wound core 8 and operates to move the chain 462 and cause the chain and sprocket arrangement to move the photocell carriage 434 and photocells 426, 428, 430 and 432 along guide bar 444 toward or away from cutting press 600.

The increment control arrangement includes a cam 504 driven by sprocket 498 and positioned to depress a lever arm 508 once for each revolution of the cam 504. The piston arm 514 of increment master cylinder 516 is attached to and operated by lever arm 508. The increment master cylinder 516 is connected through a reversing valve 518 and air lines (not shown) increment slave cylinder 520. The piston arm 522 of increment slave cylinder 520 is attached to increment slide frame 482 which is mounted on the side wall of stationary table 452. As shown in FIG. 13, the increment slide frame 482 is mounted to move between adjustable limit switch trip collars 532 and 534 along guide bar 524. Each time the lever arm 508 and piston arm 514 of increment master cylinder 516 are depressed by cam 504, the piston arm 522 of increment slave cylinder 520 and increment slide frame 482 will be moved by the pumping of air into increment slave cylinder 516 a fixed incremental distance depending on the increment setting of lever arm 508. Movement of the increment slide frame 482 causes the chain and sprocket arrangement to move the photocell carriage 434 and photocells 426, 428, 430 and 432 in increment steps. The reversing valve 518 operates when the pass length limit switch 528 is tripped by either of trip collars 532 or 534. The reversing valve 518 then switches the pumping of air from one of the ends 538 or 540 of increment slave cylinder 516 to the other of said ends. The result is that the length of the laminations such as lamination sheets 12 and 14 cut by cutting press 600 will vary in increments to give a staggered end profile of the laminations such as lamination sheets 12 and 14 when stacked as shown in FIG. 4. It may be noted that the pass length of a staggered joint of a laminated transformer core 36 is the length L of the staggered joint sections. This length L is the distance that the increment slide frame 482 and pass length limit switch 528 travel in increments to vary the position of cut for each lamination such as lamination sheets 10, 12 and 14.

A conveyor belt 702 and a plurality of stripper belts 728 for transferring the cut laminations such as lamination sheets 12 and 14 to a stacking station 700 are shown in FIGS. 15 and 16. As laminations such as lamination sheets 12 and 14 are cut they drop on conveyor belt 702 with rear edges 24 and 28 horizontally aligned and are moved toward stripper belts 728. The laminations such as lamination sheets 12 and 14 are attracted toward and held against stripper belts 728 by a series of permanent magnets 758 mounted on frames immediately above the lower portions 698 of stripper belts 728 as shown in FIG. 16. The stripper belts 728 continue to move laminations such as lamination sheets 12 and 14 to the stacking station 700, where they are stripped from stripper belts 728 by stripped bars 760 and dropped on to stacking conveyor 890. The laminations such as lamination sheets 12 and 14 are stripped in pairs so that two stacks 56 and 58 corresponding to two sections 38 and 40 of transformer core 36 are formed.

In order that staggered joint ends (see FIG. 4) of stacks 56 and 58 may be obtained during stacking, it is necessary that the milled slots 52a and 54a be vertically aligned. As can be seen in FIG. 15 the slots 52a and 54a will be offset if laminations such as lamination sheets 12 and 14 are stacked with their ends 24 and 28 vertically aligned. To obtain vertical alignment of slots 52a and 54a the stacking conveyor belt 870 is given a continuous reversing movement by stacking conveyor drive mechanism 922 which includes a reversible, variable speed transmission 942 driven by a chain 912 connected to power take-off shaft 602. By proper operation of the transmission 942 the stacking conveyor belt 870 is at all times positioned to receive the laminations such as lamination sheets 12 and 14 with slots 52a and 54a vertically aligned.

As an aid to having laminations such as lamination sheets 12 and 14 fall in orderly stacks 56 and 58 as they are stripped, the top of stacks 56 and 58 and the bottom portions 698 of stripper belts 728 are maintained a small distance apart. The photocell 866 and light source 868 are positioned to sense the height of stacks 56 and 58 at the desired distance from the bottom portions 698 of stripper belts 728. The photocell 866 will act to control stacking conveyor elevator jacks 872 to lower the stacking conveyor frame 880 as the height of stacks 56 and 58 rise to cut off the light from light source 868. Even with a minimal distance between the bottom portions 698 of stripper belts 728 and the tops of stacks 56 and 58, the laminations such as lamination sheets 12 and 14 will tend to fall with their sides 60 and 62 out of alignment. To align the sides 60 and 62, two pair of clapper bars 804 and 806 are provided. The clapper bars 804 and 806 operate to move together to align the sides 60 and 62 of stacks 56 and 58 each time a new lamination such as lamination sheet 12 or 14 is dropped on the stacks 56 and 58 by operation of stripper bars 760.

When the two stacks 56 and 58 are completed, operation of the stacking conveyor 890 is stopped, and the stacks 56 and 58 are manually run off the stacking conveyor belt 870 and onto double section transfer conveyor 958.

In FIGS. 19 and 21 is shown a core forming station 970 for forming the lamination stacks 56 and 58 into the U-shaped transformer sections 38 and 40. Since the same operation is performed on each of the lamination stacks 56 and 58, only the complete operation on stack 56 will be described here. The lamination stack 56 is moved over conveyor rollers 962 onto the rollers 1018 of forming wrap-around 1020 (see also FIG. 20). The slot 54 in the center of stack 56 is aligned with the center of the forming clamp 1010. The stack 56 is then clamped between top clamp bar 1024 and bottom clamp bar 1014 of the forming clamp 1010 and pulled downward between form-set dies 1022 by forming cylinder 1030. When the forming cylinder 1030 has pulled the lamination stack 56 down, the two form-set cylinders 1002 move inward and push the form-set dies 1022 against the stack 56 to form the stack 56 into a tight U-shaped transformer core section 38.

While the core section 38 is held between the form-set dies 1022, annealing side plates (not shown) are clamped onto core section 38 to hold it together upon its removal from between form-set dies 1022. The formed core section 38 is then released from the forming station 970 and removed for annealing.

As indicated in the foregoing description, appropriate control circuits (not shown) are provided for the control of various actuating and drive means. The control circuits are not shown in the drawings inasmuch as they are not considered a part of the invention and can be supplied by anyone skilled in the art. Several hydraulic or air operated cylinders and diaphragms are utilized in the embodiment of the invention illustrated in the drawings and these cylinders and diaphragms may be purchased on the open market and the details do not involve any of the inventive concepts of this invention. Further, control valves for most of the cylinders are not shown, but here again these valves can be purchased on the open market and no inventive skill is required to properly position and operate these valves to actuate the hydraulic and air cylinders.

*Detailed description of parts*

The winding station 70 is shown in plan view in FIGS. 7 and 9 and in side view in FIG. 8. The strip material 2 is fed over guide lip 74 and between centering guide wheels 76 of roller 78 as it enters the winding station 70.

A tension brake 80 is provided to maintain tension on the strip material 2 as it passes through the deburrers 140 and grooving unit 104 and is wound on a spindle 266a. The tension brake 80 has an upper clamp bar 82 attached to edges 86 of stationary table 72 and a lower clamp bar 84 slidably mounted adjacent the edges 86 in slots 88 (see FIG. 9). The respective upper and lower clamp bars 82 and 84 are held apart to let strip material 2 pass through by a pair of coil springs 90 positioned in facing cylindrical receptacles 92 and 94 formed, respectively, in the upper and lower clamp bars 82 and 84 (see FIG. 8). The upper and lower clamp bars 82 and 84 are urged toward each other against the compressive force of coil springs 90 and tension is maintained on strip material 2 by the force exerted by an air diaphragm 96 having a stud 98 threaded to the bottom surface of the lower clamp bar 84. To provide a smooth, non-irritating braking surface engaging the strip material 2, the upper and lower clamp bars 82 and 84 each have a suitable brake lining material 100, such as woven cotton, secured to the clamp bars by hand knob clamps 102.

The strip material 2 has a burr along its edges removed by the deburrers 140. The lower rollers 142 of the deburrers 140 are rotatably mounted on support blocks 144 affixed to the inside walls 146 of stationary table 72. The upper rollers 148 are rotatably mounted on the pivot plates 150 which are pivotally mounted on pins 152 within the support blocks 144 (See FIG. 14). The eye bolts 154 are positioned within support blocks 144 and have lower eyes 156 pivotally connected by pins 158 to pivot plates 150. The washers 160 and coil springs 162 are fitted on the eye bolts 154 within the support blocks 144. The coil springs 162 compressively bear against the support blocks 144 and against the washers 160 to force the lower eyes 156 downward and thus pivot the upper rollers 148 on pivot plates 150 against the lower rollers 142. The cam handles 164 are rotatably attached by the pins 166 to the upper eyes 168 to the eye bolts 154 and have cammed surfaces 170 bearing against the upper surfaces 172 of the support blocks 144. When the cam handles 164 are in the upward position shown in FIG. 14, the cam surfaces 170 have minimum contact with the upper surfaces 172 and thus the eye bolts 154 and the upper rollers 148 are held downward in a deburring position by coil springs 162. When the cam handles 164 are in a substantially horizontal position (not shown), the cam surfaces 170 bear against the upper surfaces 172 and pull the eye bolts 154 and upper rollers 148 upward against the compressive force of coil springs 162. The upper rollers 148 are then held out of contact with the lower rollers 142 so that strip material 2 will pass through freely and deburring will not occur.

The grooves 6, shown in FIG. 1, are formed in strip material 2 by the pairs of upper grooving wheels 106 and lower grooving wheels 108 of grooving unit 104. The lower grooving wheels 108 are affixed to shaft 110 rotatably mounted on the flanges 112 of stationary table 72. The upper grooving wheels 106 are affixed to shaft 114 rotatably mounted on moving frame 116. The moving frame 116 is pivotally attached to the upper edges 118 of stationary table 72 by shaft 120. A pair of brackets 122 affixed to sidewalls 124 of stationary table 72 support air diaphragms 126. The air diaphragms 126 are provided with threaded rods 128 attached at their upper ends 130 to moving frame 116 by nuts 132. A pair of coil springs 134 are positioned on rods 128 and held in compression by nuts 136 against the underside of flanges 112 affixed to stationary table 72. The compressive force of the coil springs 134 act to hold the moving frame 116 down and the upper grooving wheels 10 down against the lower grooving wheels 108 to form the grooves 6. The moving frame 116 is held upward and the upper grooving wheels 106 and lower grooving wheels 108 maintained apart by the operation of the air diaphragms 126 to push the threaded rods 128 upward against the downward force of coil springs 134. The air diaphragms 126 are operated when air is admitted to them through air line 138. As shown in FIGS. 9 and 10, the drive unit 174 has a drive shaft 176 that may be extended to engage the spindle shaft 266a and pull the strip material 2 through the winding station 70 and wind it on the mold 256 mounted on spindle shaft 266a. The spindle shaft end 191 and the drive shaft end 178 are respectively provided with engaging dogs 180 and 181 for transmitting the rotating drive motion of the drive shaft 176 to the spindle shaft 266a. The drive shaft 176 is attached at end 178 to double-acting air cylinder 182 through rotary coupling 184. The splines 186 of drive shaft 176 slidably engage the splines 188 of splined receptacle 190 which is mounted and driven within right angle reducing gear 206. Operation of the double-acting cylinder 182 slides drive shaft 176 through splined receptacle 190 along their respective splines 186 and 188 to thereby move the dog 180 into engagement with dog 181. A bellows 193 covers the end 178 of drive shaft 176.

The driving source for the drive shaft 176 is obtained from drive motor 194. The belt 196 connects the pulley 198 mounted on the motor shaft 200 with the pulley 202 attached to the input shaft 204 of the right angle reducing gear 206. The right angle reducing gear 206 changes the direction of the drive motion and also reduces the motor speed to the winding speed. Another pulley 208 is mounted on motor shaft 200 for driving the right angle reducing gear 210 for air valve 212. The right angle reducing gear 210 also changes the direction of the drive motion and reduces the motor speed. The belt 214 connects the pulley 208 with the pulley 218 attached to right angle reducing gear. The output shaft 220 of the right angle reducing gear 210 has a cam 222 mounted on it. The cam 222 maintains the roller 224 of air valve 212 depressed except during the period of cam 222 rotation when the cam flat surface 226 is presented to roller 224. When the roller 224 is depressed the air source connected to the end 228 of air line 230 will pass through the air valve 212 and into the air line 138 connected to air diaphragms 126. When the roller 224 is not depressed, the air valve 212 will be closed and no air will be admitted to the air diaphragms 126.

The diameter sensing arm 232 is pivotally mounted on brackets 234 affixed to stationary table 72. The strip material 2 is guided over lip 239 toward diameter sensing arm 232 by the guide wheels 243 of roller 241 which is rotatably mounted on stationary table 72. The guide wheels 233 of roller 235 rotatably mounted on brackets 237 affixed to diameter sensing arm 232 further guide strip material 2 as it moves toward spindle shaft 266a. A follower wheel 236 for following the circumference of wound core 8 as strip material 2 is wound on it is rotatably mounted on brackets 238 affixed to the end 240 of the sensing arm 232. A sealed hydraulic cylinder 242 is mounted within stationary table 72 and has a piston arm 244 pivotally attached to and exerting force upon ear 246 of sensing arm 232. The purpose of the hydraulic cylinder 242 is to maintain the follower wheel 236 of the sensing arm 232 in positive contact with the circumference of the wound core 8. An arcuate rod 248 extending within the stationary table 72 and carrying adjustable collar 250 is affixed to the sensing arm 232. As the size of the wound core 8 increases, the sensing arm 232 moves downward and the adjustable collar 250 moves closer to stationary table 72. A limit switch 252 having a switch arm 254 is mounted on stationary table 72. When the wound core 8 obtains the diameter determined by the setting of the adjustable collar 250 on the arcuate rod 248, the adjustable collar 250 will reach the stationary table 72 and contact and trip the switch arm 254. The limit switch 252 is in the electrical control circuit (not shown) for the drive motor 194. When the switch 254 arm is tripped by adjustable collar 250, the limit switch 252 will stop the drive motor 194 and thus the winding of strip material 2.

When the winding of the wound core 8 on mold 256 is completed, the platform 264 of the indexing or spindle table 258 is rotated on rollers 262 mounted on spindle table support 274 to position the spindle shaft 266a and wound core 8 in cutting position at the slot cutting station 260, as shown in FIG. 11.

At the slot cutting station 260 the milling support 278 is pivotally mounted on shaft 280 supported on milling frame 276. The gibs 282 are respectively affixed to the milling support 278 and the milling head block 284. The milling heads 286 and 288 are affixed to milling head block 284 and are respectively provided with cutting wheels 290 and 292 driven from belts 294 and 296 through the milling heads 286 and 288 by motors 298 and 300. When the wound core 8 is rotated into slot cutting position, the milling support 278 is pivoted into the cutting position shown in full lines in FIG. 11. A double-acting hydraulic cylinder 320 having an end 322 pivotally attached to ear 324 of milling frame 276 and a piston rod 326 pivotally attached to milling support 278 at ear 328 is provided for pivotally moving the milling support 278 into and out of cutting position. When the milling support 278 is moved into cutting position the milling heads 286 and 288 are moved downward along gibs 282 to cut the slots 52 and 54 in the side 50 of wound core 8 by double-acting hydraulic cylinder 302. The double-acting hydraulic cylinder 302 is mounted on milling frame 276 and has a piston rod 304 attached to the bottom end 306 of the milling support 278. When the slot cutting operation is finished the milling support 278 is moved back to a disengaged position, shown in phantom in FIG. 11, by double-acting hydraulic cylinder 320 and the milling head block 284 is raised along gibs 282 to its disengaged position by double-acting cylinder 302. The clamp block 308 is then released from wound core 8 and the wound core 8 is ready to be moved to the unwinding station 330. To hold the wound core 8 in the cutting position, the clamp block 308 of clamp 310 is raised to tightly press against the round side 51 of the wound core 8 by hydraulic cylinder 312. The clamp block 308 is attached to the upper end of shaft 314 slidably supported within clamp support 316. The hydraulic cylinder 310 has a piston rod 318 affixed to the clamp block 308 for moving the clamp block 308 into and out of contact with the wound core 8.

In FIGS. 7 and 12 is shown a wound core 8 on the end of spindle 270a at the unwinding station 330. The strip material 2 is pulled from wound core 8 over lip 332 and between the guide roller 334 rotatably mounted on brackets 335 by the upper pull roll 336 and the lower pull roll 338. The lower pull roll 338 is driven by a variable speed electric motor (not shown). The lower pull roll shaft 348 is rotatably supported on the flange edges 350 of stationary table 360 by bearing support blocks 352. The upper pull roll 336 is attached to shaft 354 rotatably supported on pivot arms 356 by bearing support blocks 358. The pivot arms 356 are pivotally mounted at their ends 362 on upright support arms 364 affixed to the flange edges 350. The ends 366 of the pivot arms 356, when in the normal downward position shown in FIG. 12, rest on the upper ends of upright end supports 368 affixed to the flange edges 350 of the stationary table 360. The pivot arms 356 are attached to and rigidly held together by cross bar support 370 and cross channel support 372. The threaded rods 374 are passed through the ends of cross channel support 372 and through the flange edges 350. The coil springs 376 are fitted over the ends of the threaded rods 374 and are compressively held against the flange edges 350 when the nuts 378 are tightened on threaded rods 374. The compressive force of the coil springs 376 on the flange edges 350 hold the pivot arms 356 down to thereby press the upper pull roll 336 and lower pull roll 338 tightly together and apply drive force to the strip material 2. A straightener roll 380 for straightening the strip material 2 is rotatably mounted on finger brackets 382 affixed to the flange edges 350.

A receptacle 384 for excess material loop 386 is located between the unwinding station 360 and the lamination cutting station 450. The photocells 388, 390, 392 and 394 and their corresponding light sources 387 are located along the walls 396 and 398 of the receptacle 384, the sides 400 of stationary table 360 and the side 402 of stationary table 452. The photocells 388, 390, 392 and 394 are connected to an electrical control circuit (not shown) for a variable speed electric motor (not shown), as previously discussed. The opening 404 is provided at the bottom end 406 of receptacle 384 for connection to a means for maintaining a reduced pressure condition in the bottom end 406 of the receptacle 384.

As the strip material 2 leaves the receptacle 384 it passes over guide roller 407 rotatably mounted on brackets 409 affixed to stationary table 452. The strip material 2 is driven through the lamination cutting station 450 by drive unit 454. The drive unit 454 has a lower drive roll 408 and an upper drive roll 410, both of which are driven by a variable speed hydraulic motor (not shown). The lower drive roll 408 is affixed to shaft 412 rotatably mounted on bearing block supports 414 attached to the flange edges 416 of stationary table 452. The upper drive roll 410 is affixed to shaft 418 rotatably mounted on drive roll frame members 420 which are bolted to frame supports 422 by bolts 424. The frame supports 422 are affixed to flange edges 416 of the stationary table 452.

As the strip material 2 continues towards the cutting press 600, its edge having slots 52a and 54a passes under photocells 426, 428, 430, and 432 mounted on photocell carriage 434 (see FIGS. 7 and 13). Each of the photocells 426, 428, 430 and 432 has a light source 425 mounted on photocell carriage 434. The photocell carriage is provided with a pair of upper roller bearings 436 rotatably mounted on the upper side 438 of the photocell carriage 434 and a pair of lower roller bearings 440 rotatably mounted on the lower side 442 of the photocell carriage 434. The roller bearings 436 and 440 movably support the photocell carriage 434 on the guide bar 444. The photocell carriage 434 has a sprocket 484 rotatably mounted and connected to chain 488 for moving the photocell carriage along guide bar 444 in accord with a control system which will be described below. The photocells 426, 428, 430 and 432 are connected to the control circuit (not shown) of a variable speed hydraulic motor (not shown) and bring the hydraulic motor to a stop when the slots 52a or 54a appear between the photocells 426, 428, 430 and 432 and their corresponding light sources 425.

At the times when the strip material 2 is stopped, the die blades (not shown) of cutting press 600 located at the lamination cutting station 450 are brought together to cut the laminations such as lamination sheets 10, 12 and 14 from strip material 2. The cutting press may be of any double crank, open back type, an example of which is Series No. 102, manufactured by the E. W. Bliss Company. A power take-off shaft 602 driven by cutting press 600 is rotatably mounted on the cutting press 600. The power take-off shaft 602 is used as a driving source for a number of devices included as part of the core manufacture machine, all of which will be described below.

As stated above, the photocell carriage 434 is mounted on guide bar 444 to move toward or away from the cutting press 600. Movement of the photocell carriage 434 is caused by a build up control arrangement and an increment control arrangement. The diameter sensing arm 446 is part of the build up control arrangement and is pivotally mounted at stationary table 360 on ears 448. The end 455 of the diameter sensing arm 446 is provided with a follower plate 456 for following the circumference of the wound core 8 as the strip material 2 is pulled off and the diameter of the wound core 8 decreases. The end 458 of the diameter sensing arm 446 is connected by clamp and bolt 460 to the chain 462. The sprockets 464 and 466 are respectively rotatably mounted within stationary table 360. The chain 462 connects each of the sprockets 464 and 466. The idler sprockets 468 and 470 are respectively rotatably mounted within stationary tables 360 and 452. An idler sprocket 472 and a dual sprocket 474 are rotatably mounted within stationary table 452. A continuous roller chain 476 connects the idler sprockets 468, 470 and 472, and dual sprocket 474, and passes between idler sprockets 478 and 480 rotatably mounted on increment slide 482. The dual sprocket 486 is rotatably mounted at the top of stationary table 452. The sprockets 484 and 486 are connected together by roller chain 488 which is also attached at its ends 490 and 492 to photocell carriage 434. The sprocket 486 is connected to the sprocket 474 by the roller chain 494. As described above, movement of the diameter sensing arm 446 as the diameter and circumference of the wound core 8 decreases will cause movement of the chains 462, 476, 494, 488 over the sprockets 464, 466, 468, 470, 480, 472, 474, 486 and 484 to move the photocell carriage 434 closer to the cutting press 600.

The actuating source for the increment control arrangement is the power take-off shaft 602. A sprocket 496 is affixed to power take-off shaft 602 and a sprocket 498 is affixed to shaft 500 rotatably supported on stationary table 452. A roller chain 502 connects the sprockets 498 and 500 which are of a diameter ratio resulting in one turn of sprocket 498 for every two turns of sprocket 496. A cam 504 having a flat face 506 is also mounted to rotate on shaft 500. A lever arm 508 is pivotally mounted on pin 510 supported by stationary table 452. The lever arm 508 is provided with a rotatably mounted cam follower wheel 512 and is pivotally connected to piston arm 514 of increment master cylinder 516. The increment master cylinder 516 is connected by air lines (not shown) through reversing valve 518 mounted on stationary table 452 to increment slave cylinder 520. The increment slave cylinder 520 is mounted on stationary table 542 and has a piston arm 522 attached to increment slide frame 482. The increment slide frame 482 is mounted to slide along the guide bar 524 of opening 520 in the stationary table 452 and is provided with rotatably mounted sprockets 478 and 480, as previously described. The increment slide frame 482 has a limit switch 528 having toggle arm 530 and 531. The limit switch collars 532 and 534 are adjustably mounted on rod 536 supported adjacent opening 526 in stationary table 452. The toggle arms 530 and 531 are respectively positioned to engage and be tripped by the limit switch collars 534 and 532 as the increment slide frame 482 slides along the guide bar 524 of opening 520.

When the toggle arm 530 engages and is tripped by adjustable collar 534 the limit switch 528 switches reversing valve 518 to cause air to be pumped through the air lines (not shown) to the end 538 of increment slave cylinder 520. The piston arm 522 will then retract into increment slave cylinder 520 and move the increment slide frame 482 toward cutting press 600. When the toggle arm 531 engages and is tripped by limit switch collar 532 the limit switch 528 switches reversing valve 518 to allow air to be pumped into the end 540 of the increment slave cylinder 520. The direction of travel of piston arm 522 will then reverse and move increment slide frame 482 away from cutting press 600. The movement of the increment slide frame 482 and its sprockets 478 and 480 back and forth in this manner causes chains 476, 494 and 488 and photocell carriage 434 to also move reversibly to vary the distance between the photocell carriage 434 and the die blades (not shown) of cutting press 600 where the laminations such as lamination sheets 12 and 14 are cut. The reversing movement is made in incremental steps due to the fact that a pump stroke by the piston arm 514 of increment master cylinder 516 is made only each time the lever arm 508 is actuated by the flat face 506 of cam 504. Due to the 2:1 diameter on ratio of the sprocket 498 and the sprocket 496 mounted on power take-off shaft 602, the lever arm 508 will be actuated and an incremental step made only for every other rotation of the power takeoff shaft 602, i.e., only for every other lamination cut made by the cutting press 600. This arrangement results in a stepped increment change of lamination length for every two laminations such as lamination sheets 10 and 12 to give the staggered joint arrangement shown in FIGS. 4, 5 and 6.

As the laminations such as lamination sheets 12 and 14 are cut by the cutting press 600, they fall on conveyor belt 702 and are carried toward the stacking station 700 by the conveyor belt 702, as shown in FIG. 15. The conveyor belt 702 is fitted over conveyor belt rollers 704 and 706. The conveyor belt roller 704 is rotatably mounted at its shaft ends 708 on the end 710 of stacking support frame 712. The conveyor belt roller 706 is rotatably mounted at its shaft ends 714 at the mid-portion 716 of stacking support frame 712. The laminations such as lamination sheets 12 and 14 are held in position on conveyor belt 702 as they come through cutting press 600 by a series of permanent magnets 718 positioned immediately beneath the upper portion 720 of conveyor belt 702 on channel iron section 722 affixed to the stacking support frame 712. A thin sheet of nonmagnetic material 724 is laid transversely over conveyor belt 702 and positioned between the laminations such as lamination sheets 12 and 14 and the conveyor belt 702 as the laminations such as lamination sheets 12 and 14 leave the cutting press 600. The purpose of the nonmagnetic sheet 724 is to momentarily prevent the laminations such as lamination sheets 12 and 14 from being moved on the conveyor belt 702 before being completely severed by the die blades (not shown) from the strip material 2. The nonmagnetic material 724 is held in place across the conveyor belt 702 by the angle frame support 726 affixed at its ends to stacking support frame 712.

A row of stripper belts 728 are provided to carry the laminations such as lamination sheets 12 and 14 from the conveyor belt 702 to the stacking station 700 (see FIG. 15). The stripper belts 728 are fitted over stripper belt rollers 730 and 732. The stripper belt roller 730 has shaft ends 734 rotatably mounted on the end 736 of stacking support frame 712. The stripper belt roller 732 has shaft ends 738 rotatably mounted on the mid-portion 716 of stacking support frame 712. The conveyor belt 702 is driven by conveyor belt roller 706 having a spur gear 740 connected to one of its shaft ends 714 and driven by the spur gear 742 connected to one of the shaft ends 738 of stripper belt roller 732. The stripper belt roller 732 drives the stripper belts 728. The driving source for the spur gears 742 and 740 is the roller chain 744 connected to the spur gear 742 and connected to the spur gear 746 mounted on the output shaft 748 of the right angle reduction gear 750. The right angle reduction gear 750 is driven at its input shaft 752 by gear 754 mounted thereon and gear 756 mounted on power takeoff shaft 602.

As the laminations such as lamination sheets 12 and 14 approach the stripper belts 728 on conveyor belt 702 they are attracted towards and held against stripper belts 728 by a series of permanent magnets 758 mounted immediately behind the stripper belts 728 on stacking support frame 712. In this manner the laminations such as lamination sheets 12 and 14 are carried toward the stacking station 700 to a position immediately beneath the stripper bars 760. Each time two laminations such as lamination sheets 10 and 12 appear beneath the stripper bars 760 the stripper bars 760 are operated downwardly to force the laminations away from the stripper belts 728 and the magnetic attraction of the permanent magnets 758 and cause the laminations such as lamination sheets 10 and 12 to drop on to superimposed lamination stacks 56 and 58. The stripper operating mechanism 770 which operates the stripper bars 760 downwardly is driven by one of the pulleys 766 connected by belt 776 to pulley 768 on the output shaft 748 of right angle gear reducer 750 at a 1:1 ratio to thus give one stripping operation for each two operations of the cutting press 600. As can be seen in FIG. 15, the series of stripper bars 760 are mounted on a shaft 774 connected at its ends to a pair of stripper operating mechanisms 770. The stripper bars 760 are attached to the stripper operating mechanism 770 by the clamp brackets 776 affixed to the fingers 778 extending from slide blocks 780. The slide blocks 780 are mounted to vertically slide on slide shaft pairs 782 supported by U-shaped frames 784 and are held in place on U-shaped frames 784 by set screws 786. The U-shaped frames 784 are rigidly attached to the sidewall 788 of the stacking support frame 712. The vertical sliding motion is imparted to slide blocks 780 by cam follower bearings 790 rotatably mounted on cam follower bearing supports 792 which are affixed to the sides of the slide blocks 780. The cam follower bearings 790 move in a vertical path as they follow the annular cam grooves 800 formed in pulleys 766. The pulleys 766 are affixed to stripper drive shaft 795 rotatably mounted on the pillow blocks 794 affixed to the U-shaped frames 784. In order to give the slide blocks 780 and thus the stripper bars 760 a positive downward motion to quickly remove the laminations such as lamination sheets 10 and 12 from the stripper belts 728 the coil springs 796 are connected between the slide blocks 780 and the cross member 798 of the U-shaped frames 784.

As the laminations such as lamination sheets 10 and 12 drop from the stripper belts 728, they will have some vibratory motion caused by the stripping operation and there will be some air resistance to their fall, together which cause the laminations to drop in stacks 56 and 58 having sides 60 and 62 somewhat out of vertical alignment. In order to keep the sides 60 and 62 of stacks 56 and 58 vertically aligned the clapper mechanisms 802 are provided (see FIGS. 15 and 17). Connected between the clapper mechanisms 802 are two clapper plates or bars 804 and two clapper plates or bars 806 which are operated to engage and vertically align the sides 60 and 62 of stacks 56 and 58 just after each stripping operation of the stripper bars 760. The clapper mechanisms 802 are driven by the roller chain 810 connected between the sprocket gear 808 affixed to clapper drive shaft 814 and sprocket gear 812 mounted on stripper drive shaft 795 (see FIG. 16). The clapper drive shaft 814 is rotatably mounted on stacking support frame 712. The clapper bars 804 are attached by brackets 816 to sliding shafts 820 mounted to slide within bars 822 and 824 projecting from the sides 826 of stacking support frame 712. The clapper bars 806 are respectively attached by brackets 818 to sliding shaft 828 mounted to slide within bars 822 and 824. The push rods 830 are pivotally connected at their ends 832 by brackets 834 to sliding shaft 820 and at their ends 836 to pivoted plate 838. The push rods 840 are pivotally connected at their ends 842 by brackets 844 to sliding shaft 828 and at their ends 846 to pivoted plate 838. The pivot plates 838 are pivotally mounted on stacking support frame 712 at shafts 848 and have cam follower bearings 850 rotatably mounted at ends 852. As can be seen in FIG. 17, the actuating coil springs 854 are connected to pivot plates 838 at pins 856 and to brackets 858 mounted on stacking support frame 712. While the cam follower bearings 850 bear against the high cam surfaces 860 of cams 862, the push rods 830 and 840 are positioned such that the clapper bars 804 and 806 are held away from the sides 60 and 62 of stacks 56 and 58. When the cam follower bearings 850 bear against the flat surface 864 of cam 862, the action of actuating coil springs 854 will cause pivot plates 838 to pivot in a clockwise direction about pivot shafts 848 and operate the push rods 830 and 840 and slide shafts 820 and 828 to bring the clapper bars 804 and 806 into engagement with the sides 60 and 62 of the stacks 56 and 58. When the high cam surfaces 860 of the cams 862 again bear against the cam follower bearings 850 the pivot plates 838 will pivot in a counterclockwise direction to pull the clapper bars 804 and 806 away from the sides 60 and 62 of stacks 56 and 58. In this manner a complete clapping operation is accomplished. The timing of the clapping operation just subsequent to the stripping operation is obtained by positioning the flat cam surfaces 864 to provide this delay. In order to avoid scraping the stacking conveyor belt 870 by the clapper bars 804 and 806 each time a clapping operation occurs, the continuous coil springs 852 are provided (see FIGS. 17 and 18) beneath the stacks 56 and 58 to hold them off the surface of the stacking conveyor belt 870.

In FIG. 18 are shown stacking conveyor elevator jacks 872 for maintaining a constant minimal distance between the bottom portions 698 of stripper belts 728 and the top of stacks 56 and 58. Maintaining this spacing at a minimum is helpful in reducing the deviation in the vertical alignment of the sides 60 and 62 of stacks 56 and 58. The screw jacks 872 are driven through drive shaft 874 and universal joint 876 by a pulley (not shown) mounted on drive shaft 874 and connected by belt 878 to air motor 882. The screw jacks 872 are connected by threaded screw shafts 884 to internally threaded bushings 886 affixed to the stacking conveyor frame 880. In FIG. 17 are shown a photocell 866 and light source 868 each mounted on stacking conveyor frame 880 and electrically connected through a control circuit (not shown) to air motor 882. The photocell 866 and light source 868 are positioned at the bottom level of the spacing which is to be maintained between the bottom portions 698 of the stripper belts 728 and the top of the stacks 56 and 58. While the photocell 866 detects light from light source 868, the air motor 882 is maintained in an off condition. As the stacks 56 and 58 increase in height due to laminations such as lamination sheets 10 and 12 sheets being added, light falling upon photocell 866 from light source 868 will be interrupted and the air motor 882 will be caused to operate the screw shafts 884 and lower the stacking conveyor frame 880 and stacking conveyor belt 870 to thus maintain a constant distance between the top of the stacks 56 and 58 and the bottom portions 698 of stripper belts 728.

As shown in FIG. 18 the stacking conveyor 890 includes a stacking conveyor frame 880 and a stacking conveyor belt 870 fitted over rollers 892 and 894 which are rotatably mounted, respectively, on shafts 896 and 898. The continuous coil springs 852, discussed above, are mounted on the roller supports 900, 902, 904, 906 and 908, all affixed to stacking conveyor frame 880. The stacking conveyor belt 870 is driven by roller shaft 896 connected through sprocket 918 and roller drive chain 920 to the sprocket 916 mounted on output shaft 954 of stacking conveyor drive mechanism 922. The drive mechanism 922 is driven from power take-off shaft 602 by sprocket 910 connected by roller chain 912 to the sprocket 914 mounted on the input shaft 924 of the drive mechanism 922. In order to maintain the roller chain 912 under constant tension, the roller chain 912 is connected to a take-up sprocket arrangement. The sprocket arrangement includes sprocket 926 mounted on stacking conveyor frame 880 and sprocket 928 rotatably mounted on rod 930. The rod 930 is pivotally attached at end 932 to the stacking conveyor frame 880 and maintained under tension at its end 934 by coil spring 936 connected between end 934 and support plate 938. A guide sprocket 940 engaging the roller chain 912 is also rotatably mounted on the support plate 938. The stacking conveyor drive mechanism 922 includes a reversible, variable speed, reducing transmission 942, air cylinders 944 and 946 pivotally connected, respectively, to reversing arm 948 and gear ratio change arm 950 of the transmission 942. Operation of the reversing arm 948 by air cylinder 944 reverses the direction of drive of the transmission output shaft 954. Operation of the gear ratio change arm 950 by air cylinder 946 changes the speed of transmission output shaft 954. A manual disconnect clutch 952 is connected to the output shaft 954 of the transmission 942. The stacking conveyor belt 870 is operated in a direction and at a speed dependent upon the speed and direction of operation of the transmission output shaft 954. The air cylinders 944 and 946 are operated in response to the energization of a solenoid air valve (not shown) by the pass length limit switch 528 mounted on the increment slide frame 482, discussed above, and two stepping switches 542 and 546 mounted on stationary table 452.

In order to obtain the staggered profile of a lamination stack 56, as shown in FIG. 4, the slots 52a or 54a of the laminations such as lamination sheets 10, 12 and 14 must be in vertical alignment. As can be seen in FIG. 15, the respective ends 20, 24 and 28 of the lamination sheets 10, 12 and 14 are aligned such that upon stacking the ends 20, 24 and 28 would be in vertical alignment in their respective lamination stacks 56 or 58 but the slots 52a and 54a would be out of alignment. The slots 52a and 54a would be out of alignment by an amount proportional to the combined total of the change in lamination length due to the decrease in circumference of the wound core 8 during unwinding and the increment change in lamination length to provide an overlapped, staggered core joint.

The tripping of the pass length limit switch 528 by one of the limit switch collars 532 or 534 indicates a change in direction of movement of increment length change of adjacent laminations such as lamination sheets 10 and 12, and thus a change in direction of movement of the centers of the laminations such as lamination sheets 10 and 12 relative to the position of their respective slots 52a and 54a. This change in direction of movement occurs at the lamination cutting station 450 immediately, however, the direction change should not occur in the stacking conveyor belt 870 until those laminations cut immediately following the direction change appear at the stacking conveyor belt 870. It is thus necessary that the number of laminations cut, i.e., the operations of the cutting press 600, be counted until the first of the laminations cut following the direction change drop onto the stacking conveyor belt 870. At a given speed of the cutting press 600, the number of laminations between the cutting press 600 and the stacking conveyor belt 870 will remain constant since the conveyor belt 702, the stripper belts 728, and the stripper operating mechanism 770 are all driven at a fixed speed by the cutting press 600. Thus, a fixed count delay after the pass length limit switch 528 is tripped will determine when the direction and speed of the stacking conveyor belt 870 should be changed. A different speed in each direction of travel of the stacking conveyor belt 870 is required due to the increment length change adding to the length change due to decreasing circumference of wound core 8 when the increment length change is moving to decrease lamination length, and subtracting from length change when the increment length change is to moving to increase lamination length. When the two length changes are adding, a higher stacking conveyor belt speed will be required and when the two length changes are subtracting a lower speed is necessary.

At the time the pass length limit switch 528 is tripped, one of the stepping switches 542 or 546 is also tripped by finger 550 mounted on increment slide frame 482. The stepping switches 542 and 546 are set to make the required count delay and are connected through an electrical control circuit (not shown) to the solenoid air valve (not shown) which operates air cylinders 944 and 946. When the stepping switch 542 or 546 counts out, the air solenoid (not shown) allows operation of the air cylinders 944 and 946.

This operation is repeated each time the pass length limit switch 528 and one of the stepping switches 542 or 546 is actuated, to thereby superimpose the laminations such as lamination sheet 12 in a stack 56. Upon completion of the stacking operation, the drive mechanism 922 may be manually disconnected from the roller drive chain 920 by manual clutch 952. The stacking conveyor belt 870 then can be manually moved by use of hand crank 956 to move the stacks 56 and 58 over to the transfer conveyor 960 going to the core forming station 970.

As shown in FIGS. 19 and 21 the lamination stacks 56 and 58 are first moved from the stacking conveyor belt 870 to the double section transfer conveyor 958. Both the double section transfer conveyor 958 and the single section transfer conveyor 960 are provided with a series of conveyor rollers 962. On the single section transfer conveyor 960, the conveyor rollers 962 are rotatably mounted between side frames 964. On the double section transfer conveyor 958 the conveyor rollers 962 are rotatably supported between side frames 966 and center support 968. As can be seen in FIG. 21, both of the lamination stacks 56 and 58 may be simultaneously moved on to the double section transfer conveyor 958. In order to align each single section of the double section transfer conveyor 958 with the single section transfer conveyor 960 to individually move the lamination stacks 56 and 58 to the forming station 970, the double section transfer conveyor 958 is provided with two pairs of rollers 972 and 974 rotatably mounted, respectively, within U-shaped supports 976 and 978 on the bottom of double section transfer conveyor 958. The rollers 972 and 974 are provided with suitably shaped grooves 980 to follow and roll along tracks 982 and 984 mounted on double section conveyor support frame 986. A shaft 992 connects pinion gears 988 and 990 and is rotatably mounted on double section transfer conveyor 958. The pinion gears 988 and 990 respectively engage and rotate on racks 996 and 994 affixed to support frame 986. As the double section transfer conveyor 958 moves along tracks 982 and 984, the engagement of pinion gears 988 and 990 with racks 958, 996 and 994 prevents canting of the double section transfer conveyor on tracks 982 and 984.

The lamination stacks 56 and 58 are now rolled from the double section transfer conveyor 958 to the single section transfer conveyor 960 and onto the rollers 1018 of the forming wraparound 1020 positioned at the core forming station 970. At the core forming station 970, as can be best seen in FIG. 20, an annealing window block 1026 and a window block spacer 1028 are placed on top of the lamination stack 56 or 58 at the core forming station 970. The forming wraparound 1020, the lamination stack 56 or 58, the annealing window block 1026 and the window block spacer 1028 are then clamped between the top clamp bar 1024 and the bottom clamp bar 1014. The forming clamp 1010 consists of bottom clamp bar 1014, an upright rod 1008 attached to the end 1005 of bottom clamp bar 1014 and a top clamp bar 1024 pivotally mounted on the upper end 1007 of the upright rod 1008. A movable threaded rod 998 is pivotally attached to the end 1025 of the top clamp bar 1024 and is moved into the bifurcated end 1006 of bottom clamp bar 1014 to allow clamping of the lamination stack 56 when the threaded wing nut 1009 is tightened upon the lower end of the threaded rod 998. The lower clamp bar 1014 is rigidly attached to the upper end 1004 of the piston rod 1016 of hydraulic cylinder 1030 mounted on the bottom of stationary table 1000 below the forming clamp 1010. After the forming clamp 1010 has been tightened about the lamination stack 56 or 58, the hydraulic cylinder 1030 may be operated to pull the lamination stack 56 or 58 down between the form-set dies 1022 to form substantially a U-shaped configuration from the lamination stack 56 or 58, as shown in FIG. 20. The two form-set cylinders 1002 may now be operated to push the form-set dies 1022 against the lamination stack 56 or 58 to form the stack 56 or 58 into a tight U-shaped transformer core section 38 or 40. The transformer core section 38 or 40 may now be clamped in its U-shaped figuration by suitable means (not shown) and removed from the core forming station 970 for annealing.

As can be seen in FIG. 20, the forming wraparound 1020 bends and remains in engagement with the lamination stack 56 or 58 when it is formed into a U-shaped configuration between form-set dies 1022. The purpose of the forming wraparound 1020 is to rigidly hold the full length of the lamination stack 56 or 58 extending above the form-set dies 1022 in a tight U-shaped configuration of transformer core section 40 or 38. The forming wraparound 1020 includes three rigid portions 1032, 1034 and 1036 connected by two flexible portions 1038 and 1040. The flexible portions 1038 and 1040 are made of any suitable material, such as spring steel, and are rigidly attached at their ends to rigid portions 1032, 1034 and 1036. A series of rollers 1042 are rotatably mounted within the respective faces 1044, 1046 and 1048 of the rigid portions 1032, 1034 and 1036 on roller axles 1058. The roller axles 1058 are rotatably supported by resilient means 1060 positioned within the rigid portions 1032, 1034 and 1036 as seen in FIG. 19. The lamination stacks such as stack 56 or 58 are supported at the forming station 970 on the rollers 1042 of the forming wrap-around 1020. Resiliently mounting the rollers 1042 and roller axles 1058 on resilient means 1060 allows the rollers 1042 to retract into the rigid portions 1032, 1034 and 1036 of the forming wraparound 1020 when pressure is applied to the lamination stack 56 or 58 by form-set dies 1022. The wear plates 1062, 1064 and 1066 may be affixed to the sides of the rigid portions 1032, 1034 and 1036 to minimize wear on the forming wraparound 1020 due to the action of the form-set dies 1022.

What has been described is considered to be the preferred method and apparatus for manufacturing a laminated magnetic core. It will, however, be apparent to those skilled in the art that many modifications and alterations may be made without departing from the invention, and we intend in the appended claims to cover all such modifications and variations as fall within the true spirit and scope of the invention.

What is claimed is:

1. A machine for the fabrication of a laminated magnetic core comprising, in combination, means for forming a plurality of longitudinally spaced apart grooves in magnetic core strip material, means for winding a predetermined length of said magnetic core strip material in a toroidal core configuration, cutting means for forming at least one opening in said toroidal core configuration along a diameter thereof, means for unwinding said toroidal core configuration, whereby said opening in the toroidal core configuration is presented as a plurality of spaced apart openings centered on a longitudinal line of said length of magnetic core strip material, compressive means for removing said plurality of grooves from said length of magnetic core strip material, lamination cutting means responsive to the presence at a predetermined location of each of said spaced apart openings for cutting said length of magnetic core strip material into a plurality of lamination sheets each having one of said spaced apart openings therein, means for varying the longitudinal position of the cuts, made by said cutting means in said length of magnetic core strip material, said means for varying the longitudinal position of the cuts being responsive to the decreasing diameter of said toroidal core configuration during unwinding thereof, means for vertically stacking said lamination sheets in at least one stack having two longitudinal sides in vertical alignment and with said spaced apart openings in said lamination sheets in vertical alignment, and means for forming at least a portion of said laminated magnetic core from said stack of lamination sheets.

2. The combination of claim 1 and including increment means for varying the longitudinal position of said cuts made by said cutting means in said length of magnetic core strip material, said increment means cooperating with said means for varying the longitudinal position of said cuts to provide a variation in the longitudinal position of said cuts, said means for vertically stacking said lamination sheets including conveyor means having a reversing movement for aligning said spaced apart openings within vertical planes transverse to said longitudinal sides of said stack and aligning means reciprocally engaging said longitudinal sides of said stack for vertically aligning said longitudinal sides, belt transfer means having a plurality of spaced apart belts for positioning said lamination sheets above said conveyor means, means for removing said lamination sheets from said belt transfer means at said conveyor means.

3. The combination of claim 2 wherein said means for varying the longitudinal position of the cuts made by said cutting means in said length of magnetic core strip material includes a means for sensing the presence of said spaced apart openings, carriage means for moving said means for sensing along a line parallel to said longitudinal line on which said spaced apart openings are centered, moving arm means for sensing the decreasing diameter of said toroidal configuration, chain and sprocket means connecting said moving arm means and said carriage means for moving said carriage means in response to movement of said moving arm means whereby said carriage means varies the position of said sensing means along said line parallel to said longitudinal line.

4. The combination of claim 2 wherein said means for stacking said lamination sheets includes a support frame having a pair of belt rollers rotatably mounted thereon, said plurality of spaced apart belts being supporting and driven by said belt rollers, said spaced apart belts each having lower horizontal portions, magnetic means positioned immediately above said lower horizontal portions of said spaced apart belts for picking up and holding said lamination sheets against said lower horizontal portions of said spaced apart belts, a plurality of horizontally positioned rods mounted on said support frame in register with the spaces between said plurality of spaced apart belts, and means for operating said rods into engagement with said lamination sheets to disengage said lamination sheets from said spaced apart belts.

5. The combination of claim 2 wherein said conveyor means has a variable speed reversible drive means for providing said reversing movement, said drive means being responsive as to both direction and speed to the operation of said lamination cutting means, said aligning means having a pair of rods each slidably mounted on said support frame, at least one pair of bars each of which are separately supported by one of said rods, and a drive means attached to said rods for moving said bars into and out of engagement with said longitudinal sides.

6. The combination of claim 3 and including a support having a guide bar positioned parallel to said longitudinal line on which said spaced apart openings are centered, said carriage means including a frame having a plurality of rollers mounted to engage said guide bar from opposing sides, whereby said frame is movably supported on said guide bar, said moving arm means including an arm having an outer end engaging the outer circumference of said toroidal configuration and an inner end connected to said chain and sprocket means, said arm being pivotally mounted on said support intermediate said inner and outer ends.

7. The combination of claim 2 wherein said increment means includes a support having a guide bar postioned adjacent said chain and sprocket means, a frame slidably supported on said guide bar, said frame having a plurality of rotatably mounted sprockets connected to said chain and sprocket means, and fluid cylinder means for reversibly sliding said frame on said guide bar in incremental steps, said fluid cylinder means being responsive to the operation of said lamination cutting means, whereby said chain and sprocket means transmits the reversible incremental step movement of said frame to said carriage means.

8. The combination of claim 1 wherein said means for forming includes a support means having a plurality of flexible portions and a plurality of rigid portions for supporting said stack of lamination sheets during the forming of said laminated magnetic core.

9. The combination of claim 8 wherein said rigid portions have a load bearing side and a plurality of rollers resiliently mounted within said rigid portions and protruding from said load bearing side, whereby said rollers movably support said stack of lamination sheets prior to operation of said means for forming and resiliently withdraw into said rigid portions upon operation of said means for forming.

10. The method of forming a laminated magnetic core having an overlapped staggered butt joint from magnetic core strip steel comprising the steps of providing a continuous strip of magnetic core strip steel, forming a plurality of pairs of coextensive grooves at spaced apart intervals in and parallel to the longitudinal dimension of said strip of magnetic core strip steel, winding a length of said strip of magnetic core strip steel having said grooves formed therein to form a wound toroidal core, forming at least one reference opening along a diameter of said wound toroidal core, whereby said length of magnetic core strip steel forming said wound toroidal core has a plurality of reference openings formed therein, compressively applying driving force to unwind and move said lengh of magnetic core strip steel from said wound toroidal core to a lamination cutting station, the application of said driving force being effective to remove said grooves from said length of magnetic core strip steel, cutting said length of magnetic core strip steel into a plurality of lamination sheets of varying length each having one of said plurality of reference openings therein in response to the presence of each of said plurality of reference openings at a predetermined location, superimposing said lamination sheets in at least one stack with said reference openings in alignment, and bending said stack into a laminated magnetic core section.

11. The method of claim 10 further comprising the steps of measuring said length of magnetic core strip steel by sensing the diameter of said wound toroidal core while said strip of magnetic core strip steel is being wound thereon and forming said reference opening with a milling cutter along a diameter on a side of said wound toroidal core.

12. The method of claim 10 further comprising the step of varying the length of said lamination sheets and the distance of the centers of each of said lamination sheets from said reference openings in said lamination sheets by varying the position at which the presence of said reference openings is sensed by a distance equal to the proportional decrease in the length of the circumference of said wound toroidal core as it is unwound attributable to each of said lamination sheets cut and a fixed incremental length change.

13. The method of claim 10 further comprising the steps of transferring said lamination sheets in a suspended position from the bottom side of a plurality of spaced apart belts positioned transversely to the length of said lamination sheets, and removing said lamination sheets from said spaced apart belts by moving a plurality of bars downward between said spaced apart belts into engagement with said lamination sheets.

14. The method of claim 10 wherein the step of superimposing said lamination sheets includes the aligning of said reference openings by receiving said lamination sheets on a support having a variable speed continuously reversing movement, the direction and speed of the support movement being effective to receive the lamination sheets in a superimposed position with said reference openings in vertical alignment.

15. The method of claim 10 wherein the step of bending said stack includes the centering of said stack on a support having a plurality of rigid portions connected by a plurality of flexible portions, drawing said stack and said support as a unit between a plurality of guides to bend said stack and said support into a U-shaped transformer core configuration, at least two of said plurality of rigid portions of said support being contiguous with the upright arms of said U-shaped transformer core configuration, and compressively urging said two rigid portions of said support toward each other to form a tight U-shaped transformer core configuration.

References Cited

UNITED STATES PATENTS

| | | | |
|---|---|---|---|
| 3,008,222 | 11/1961 | Steinmayer | 29—605 |
| 3,027,628 | 4/1962 | Wilk et al. | 29—605 |
| 3,186,067 | 6/1965 | Somerville | 29—605 |
| 3,327,373 | 6/1967 | Somerville | 29—605 |

JOHN F. CAMPBELL, *Primary Examiner.*

C. E. HALL, *Assistant Examiner.*

U.S. Cl. X.R.

29—203, 609; 242—9, 56